United States Patent [19]

Bussing

[11] Patent Number: 5,513,489
[45] Date of Patent: * May 7, 1996

[54] ROTARY VALVE MULTIPLE COMBUSTOR PULSE DETONATION ENGINE

[75] Inventor: Thomas R. A. Bussing, Issaquah, Wash.

[73] Assignee: Adroit Systems, Inc., Alexandria, Va.

[*] Notice: The portion of the term of this patent subsequent to Sep. 13, 2011, has been disclaimed.

[21] Appl. No.: 205,505

[22] Filed: Mar. 4, 1994

Related U.S. Application Data

[63] Continuation-in-part of Ser. No. 45,771, Apr. 14, 1993, Pat. No. 5,345,758.

[51] Int. Cl.$^6$ .................................................. F02C 5/02
[52] U.S. Cl. ............... 60/39.38; 60/39.39; 60/39.76; 60/39.78; 60/39.827; 60/255; 60/267
[58] Field of Search ............... 60/39.38, 39.39, 60/39.76, 39.78, 39.821, 39.826, 39.827, 253, 255, 267; 431/1

[56] References Cited

U.S. PATENT DOCUMENTS

| | | | |
|---|---|---|---|
| 1,395,995 | 11/1921 | George | 60/39.39 |
| 1,552,272 | 9/1925 | Carner | 60/39.39 |
| 2,168,313 | 8/1939 | Bichowsky | 60/39.55 |
| 2,515,644 | 7/1950 | Goddard | 60/39.77 |
| 2,557,198 | 6/1951 | Nichols | 60/39.39 |
| 2,563,022 | 8/1951 | Goddard | 60/39.76 |
| 2,640,314 | 6/1953 | Abel | 60/39.76 |
| 2,659,198 | 11/1953 | Cook | 60/39.39 |
| 2,923,124 | 2/1960 | Mendez-Llamozas | 60/39.78 |
| 2,928,242 | 3/1960 | Guenther | 60/39.39 |
| 2,930,196 | 3/1960 | Hertzberg et al. | 60/39.76 |
| 2,942,412 | 6/1960 | Bollay | 60/39.77 |
| 3,008,292 | 11/1961 | Logan, Jr. | 60/39.76 |
| 3,494,127 | 2/1970 | Brille | 60/39.39 |
| 3,849,983 | 11/1974 | Cherry | 60/255 |
| 3,877,219 | 4/1975 | Hagen | 60/39.39 |
| 3,954,380 | 5/1976 | Valaev et al. | 431/1 |
| 4,458,595 | 7/1984 | Gerrish, Jr. et al. | 60/253 |
| 4,538,410 | 9/1985 | Klaebo | 60/39.02 |
| 4,741,154 | 5/1988 | Eidelman | 60/39.34 |
| 5,154,051 | 10/1992 | Mouritzen | 60/267 |
| 5,212,944 | 5/1993 | Martin | 60/253 |
| 5,267,437 | 12/1993 | Foust | 60/267 |
| 5,345,758 | 9/1994 | Bussing | 60/39.38 |

FOREIGN PATENT DOCUMENTS

| | | | |
|---|---|---|---|
| 1014794 | 8/1957 | Germany | 60/39.39 |
| 1274411 | 8/1968 | Germany | 60/39.78 |

OTHER PUBLICATIONS

Cambier et al. Preliminary Numerical Simulations of a Pulsed Detonation Wave Engine, AIAA Paper 88–2960, Jul. 1988.
Eidelman et al. Pulsed Detonation Engine Experimental and Theoretical Review, AIAA Paper 92–3168, Jul. 1992.
Eidelman et al. Air Breathing Pulsed Detonation Concept; A Numerical Study, AIAA Paper 90–2420, Jul. 1990.
Helman et al. Detonation Pulse Engine, AIAA Paper 86–1683, Jun. 1986.
Wortman et al. Detonation Duct Gas Generator Demonstration Program, AIAA Paper 92–3174, Jul. 1992.
"Improved Emissions Performance In Today's Combustion System", Carlstrom et al., GE Seminar, Athens Greece, Jun. 1978, pp. 1–18.

Primary Examiner—Richard A. Bertsch
Assistant Examiner—Ted Kim
Attorney, Agent, or Firm—Collier, Shannon, Rill & Scott

[57] ABSTRACT

A pulse detonation engine is provided with at least one detonation combustor selectively coupled to an air inlet and fuel source. The detonation combustors are equipped with either active or passive means to dissipate the heat of detonation. Fuel, air, and an oxidizer can be fed to said detonation combustors either through a rotary valve or through a conically shaped injector head.

39 Claims, 25 Drawing Sheets

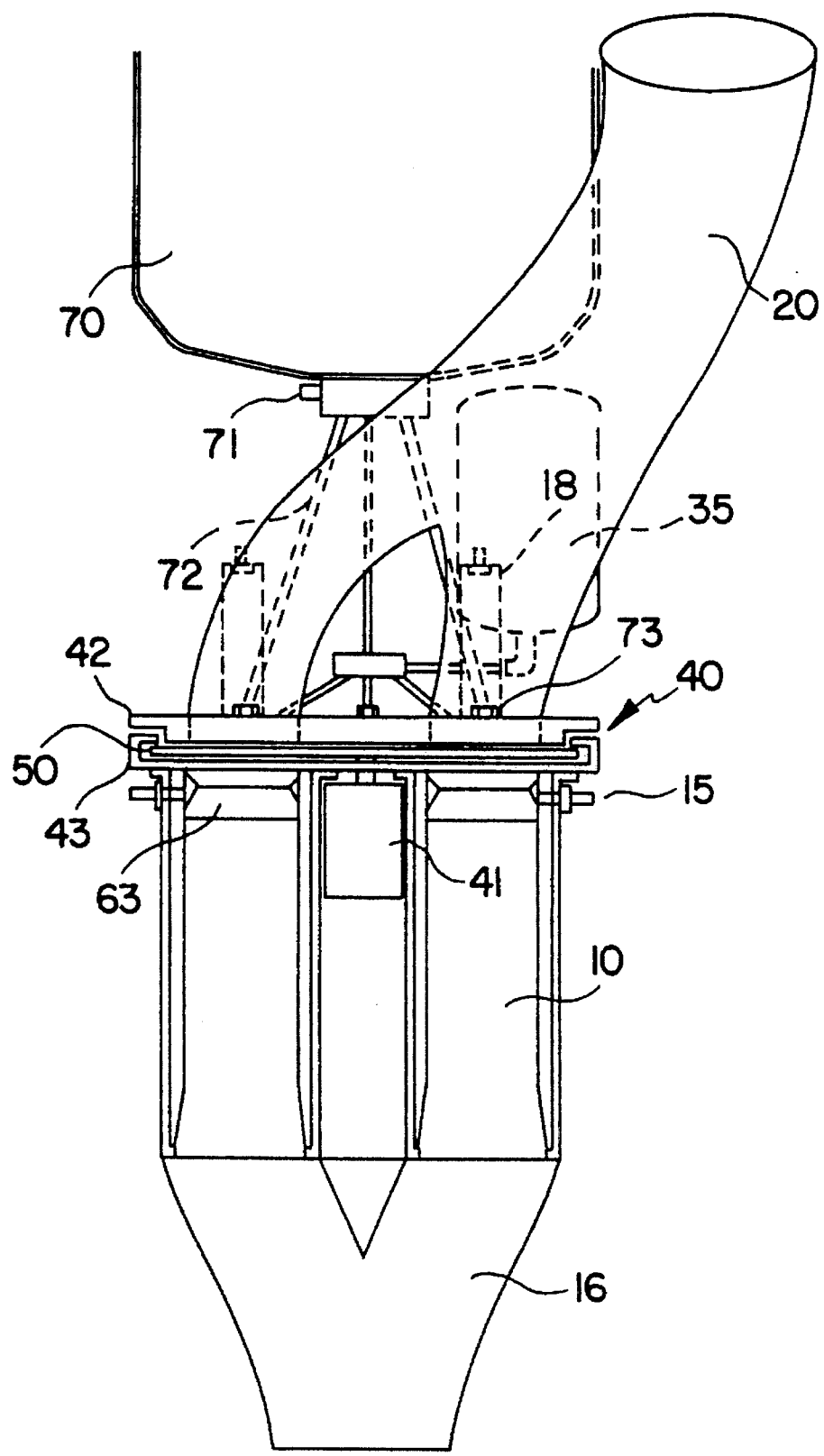
FIG. IB

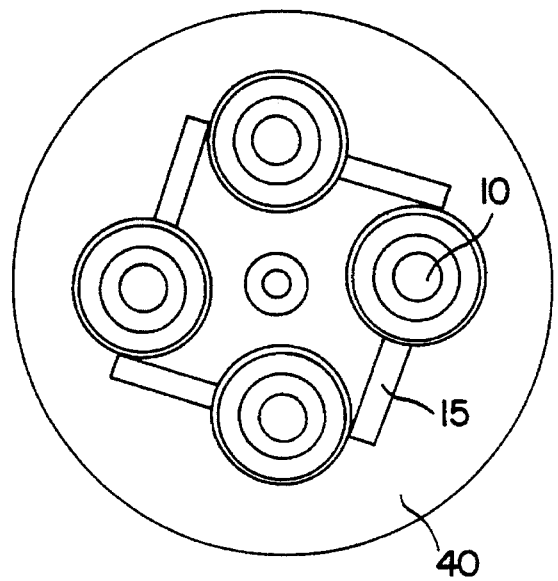
F I G. 5
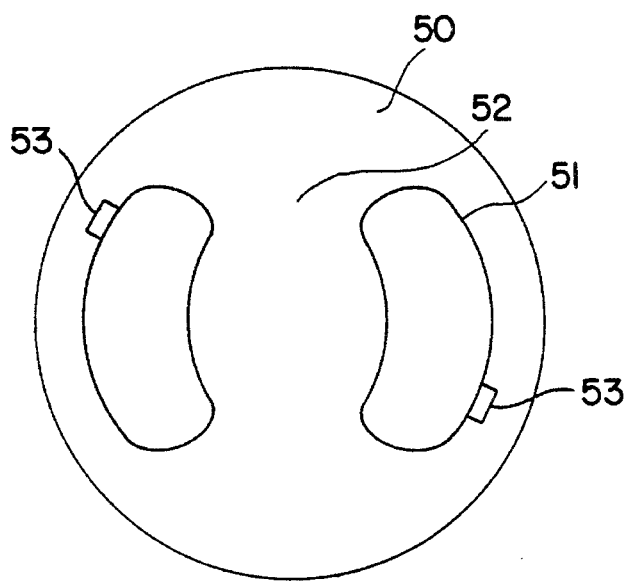
F I G. 6
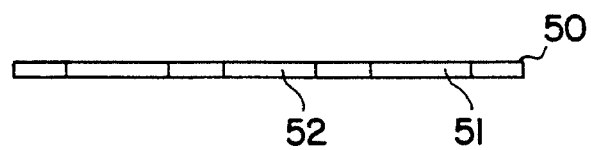
F I G. 7

To Solid Particle Removal System

Turbine

- USE SIMPLE ELECTROLYSIS TO PRODUCE $O_2$, $H_2$ DIRECTLY FOR PRE-DETONATION
- MOST OF ENEGRY RECOVERED SINCE ADDED BACK INTO FLOW

ROTARY VALVE MULTIPLE COMBUSTOR PULSE DETONATION ENGINE

CROSS REFERENCE TO RELATED APPLICATION

This application is a continuation-in-part of prior United States application Ser. No. 08\045,771, filed Apr. 14, 1993, by Thomas R. A. Bussing, now U.S. Pat. No. 5,345,758.

BACKGROUND OF THE INVENTION

1. Field of the Invention

The present invention relates to intermittent combustion engines in which the combustion products are used as a motive fluid.

2. Description of Related Art

Intermittent combustion engines in the form of pulse jet engines, such as those in U.S. Pat. No. 2,930,196 to Hertzberg, et al., U.S. Pat. No. 2,515,644 to Goddard, and U.S. Pat. No. 3,008,292 to Logan, are known. Pulse combustion in these prior art engines is deflagrative in nature.

A deflagration combustion process results in propagation velocities on the order of a few feet per second. A detonation process, by contrast, can result in propagation velocities on the order of several thousands of feet per second.

The use of a detonation combustion process in an engine has been suggested. For example, U.S. Pat. No. 4,741,154 to Eidelman shows a rotary engine using a detonation process.

SUMMARY OF THE INVENTION

An object of the present invention is to provide a pulse detonation engine with design and operational simplicity.

Another object of the present invention is to provide a pulse detonation propulsion system with significant performance advantages in the subsonic and super sonic flight regimes.

Another object of the present invention is to provide a pulse detonation propulsion system that can operate at higher cycle frequencies and lower inlet losses than previous intermittent combustion engines.

Another object of the present invention is to provide a pulse detonation propulsion system with the advantage of storability.

The present invention achieves the above objectives by providing a pulse detonation engine with several detonation combustors selectively coupled to an air inlet and fuel source by a rotary valve. The rotary valve isolates the steady operation of the air inlet and fuel system from the unsteady nature of the detonation process, and allows the fuelling of some of the detonation chambers while detonation occurs in other detonation chambers. The fuel system can use liquid, gaseous, or solid fuel.

BRIEF DESCRIPTION OF THE DRAWINGS

FIG. 1B shows a cross-sectional view of an alternative embodiment of the pulse detonation engine of the present invention;

FIG. 3AA shows a cross-sectional view of an alternate embodiment of the pulse detonation combustors and the manifold/rotor assembly of the present invention, wherein the combustors include active cooling means;

FIG. 5 shows a bottom view of the pulse detonation combustors of FIG. 2;

FIG. 6 shows a top view of the rotor disk valve of the pulse detonation engine of FIG. 1;

FIG. 7 shows a side view of the rotor disk of FIG. 6;

DESCRIPTION OF THE PREFERRED EMBODIMENTS

Figure 1A:
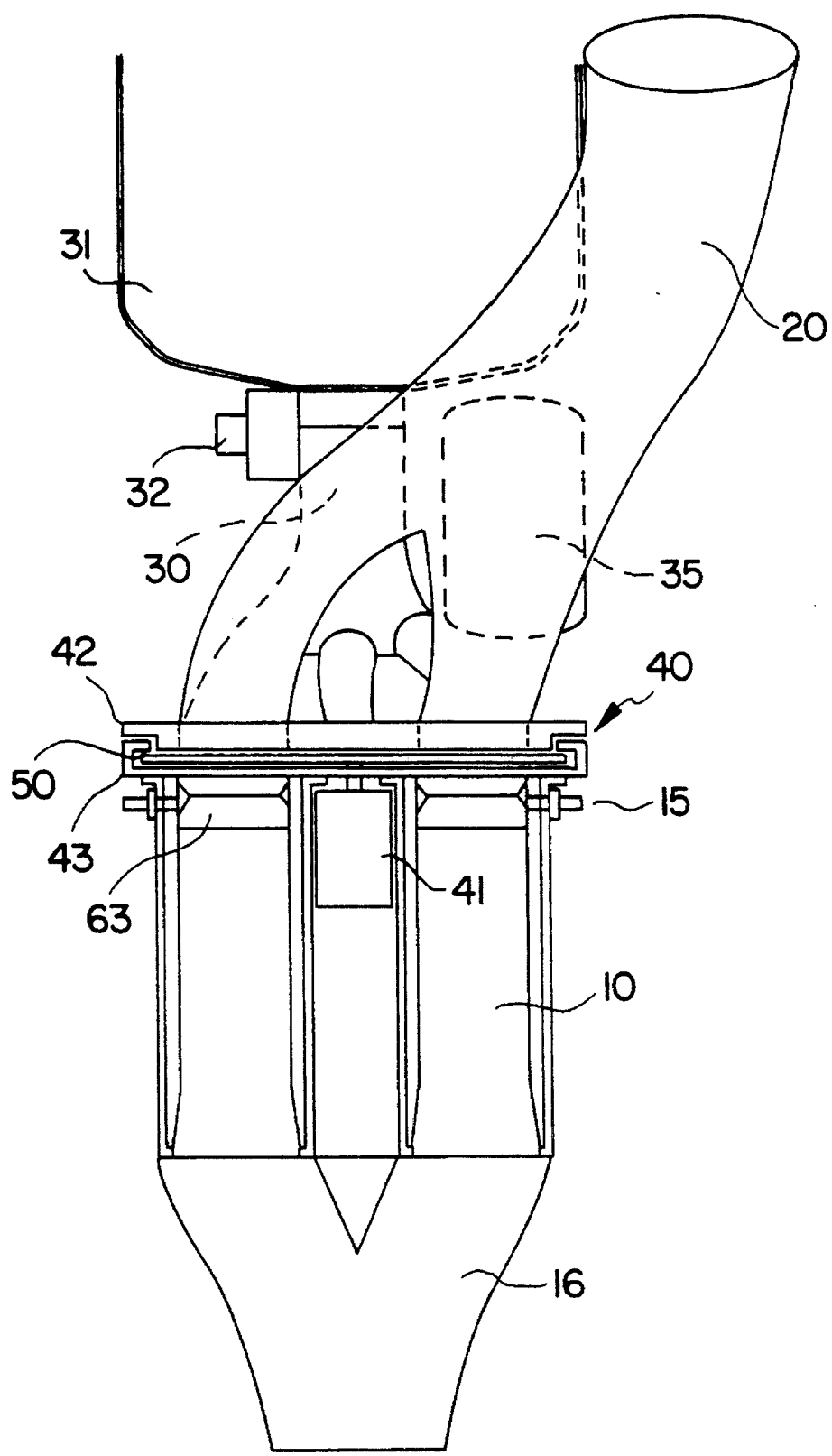
FIG. 1A shows a cross-sectional view of one embodiment of the pulse detonation engine of the present invention.

FIG. 1A shows a cross-sectional view of one embodiment of the pulse detonation engine of the present invention. The engine has one or more combustors or detonation chambers 10, each of which has an elongated, tubular, or pie-shaped construction. The combustors could also be circular, square, or other shapes. The lengths of the combustors 10 extend parallel to each other, so that they each produce thrust in the same direction. A nozzle shroud 16 can be used at the outlet end of the combustors 10 to create a quasi-uniform exit flow. Alternatively, and as illustrated in FIG. 4, the shroud 16 can be a diverging shroud or nozzle.

The combustors 10 are fueled with air from an inlet air duct manifold 20 and fuel from a fuel manifold 30. The inlet for the air duct manifold 20 can be in the form of a simple normal shock inlet. The fuel manifold 30 delivers fuel from a fuel source 31 which can be controlled by a valve 32. The pulse detonation engine of the present invention can use solid, liquid, or gas fuel. For example, the fuel source can be a solid fuel gas generator which can be controlled by a gas generator control valve. Depending on the choice of fuel, an oxidizer generator 35 can be used.

The combustors 10 are coupled to the inlet air duct manifold 20 and the fuel manifold 30 by a manifold/rotor assembly 40. The manifold/rotor assembly 40 has a rotor disk valve 50 positioned between a fuel/air manifold mounting plate 42 on the upper side of the manifold/rotor assembly 40 and a combustor mounting plate 43 on the lower side of the manifold/rotor assembly 40. The upper mounting plate 42 is coupled to the air manifold 20 and the fuel manifold 30, while the lower mounting plate 43 is coupled to the combustors 10.

The rotor disk valve 50 is positioned for rotation between the upper fuel/air manifold mounting plate 42 and the lower combustor mounting plate 43. The rotor disk valve 50 has openings 51 and 53 (see FIG. 6) and is rotated by a rotor drive motor 41, so that it can alternately open and close the passage between the fuel and air manifolds and the combustors.

An igniter 15, which can be, for example, a spark plug, is arranged near the inlet end of each combustor 10. An impingement ring 63 can also be positioned near the inlet end of each combustor 10 to assist in mixing the fuel and air in preparation for detonation.

Figure 1C:
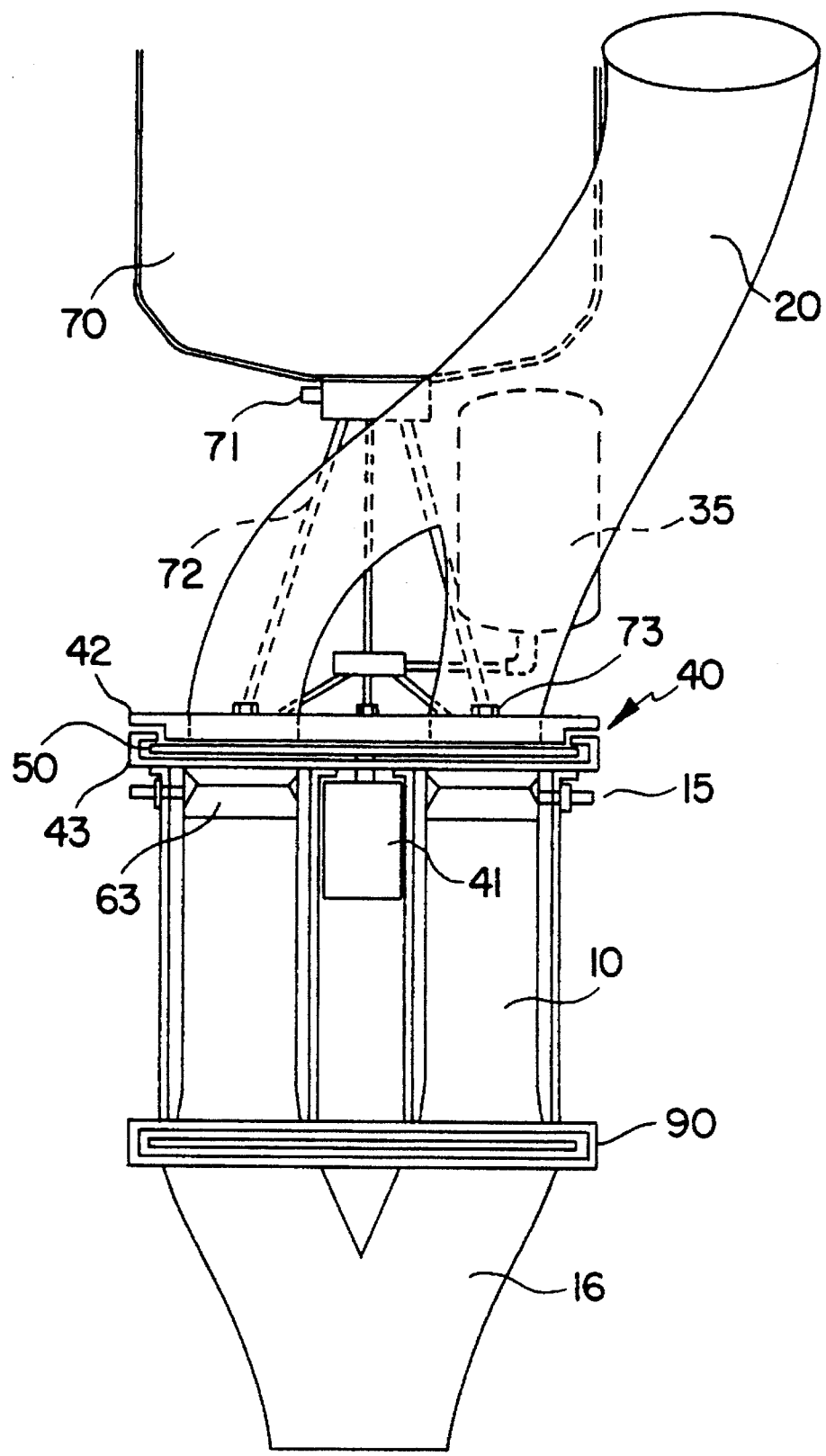
FIG. 1C shows a cross-sectional view of one embodiment of the invention having a lower manifold/rotor assembly.

FIG. 1B and 1C show cross-sectional views of other embodiments of the pulse detonation engine of this invention. The embodiment of FIG. 1C has an exit nozzle rotor valve 90 at the bottom or exhaust end of the pulse detonation combustors.

Figures 1D, 1E:
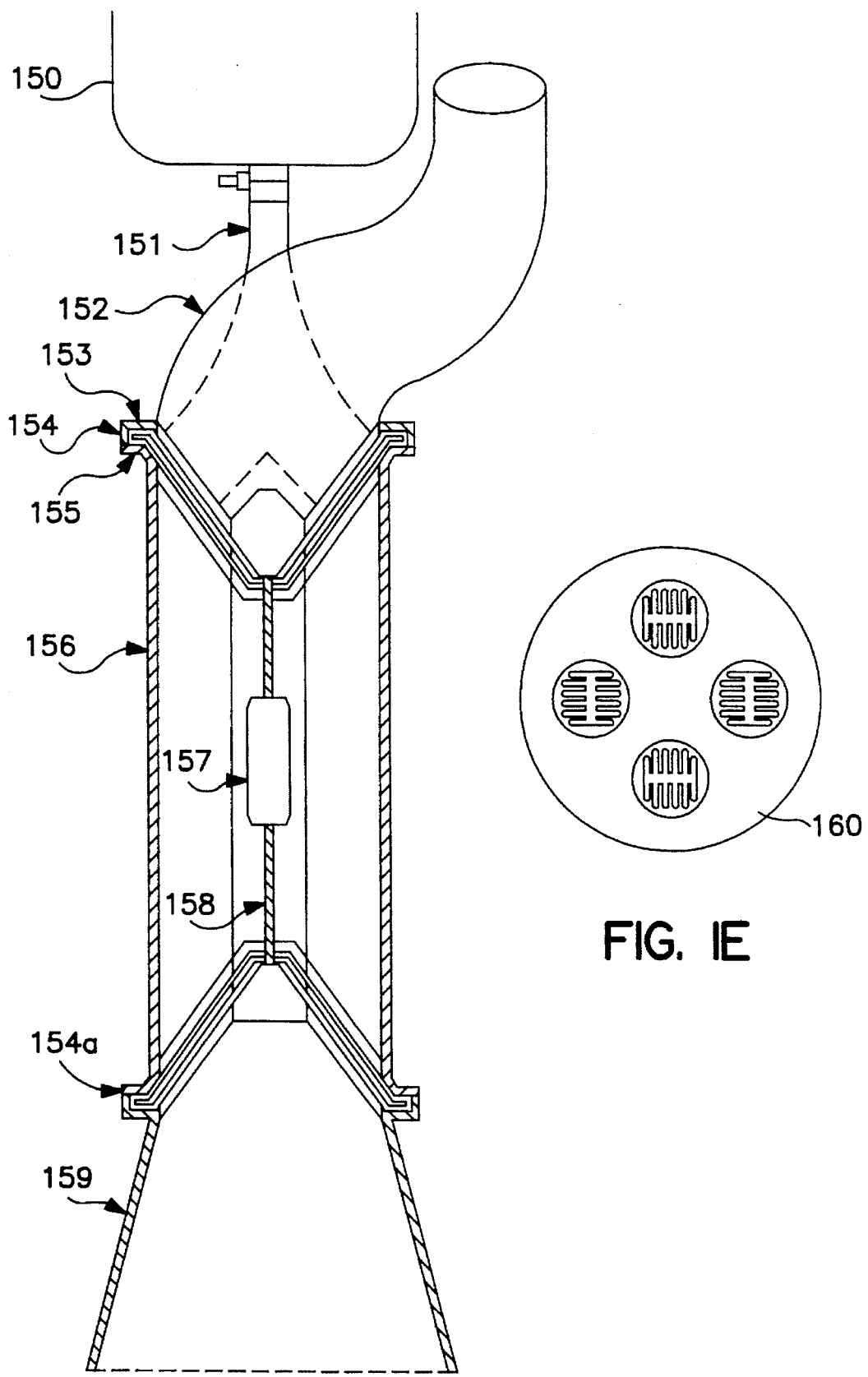
FIG. 1D shows a cross-sectional view of one embodiment of a conical rotor valve.
FIG. 1E shows a top view of one embodiment of manifold and rotor positioning.

FIG. 1D shows a cross-sectional view of one embodiment of a conical rotor valve. The conical rotor valve reduces inlet losses and nozzle dump losses. The conical rotor valve of this embodiment has a gas generator 150, fuel manifold 151, air manifold 152, upper manifold 153, conical rotor 154, lower manifold 155, lower conical valve 154a, detonation tube 156, motor assembly 157, drive shaft 158, lower valve 154a, and diverging nozzle 159 for supersonic flow.

FIG. 1E shows a top view of manifold and rotor positioning for the conical rotor valve of FIG. 1D. The solid lines represent the upper manifold 153 and the dotted lines represent the conical rotor 154.

Figure 2:
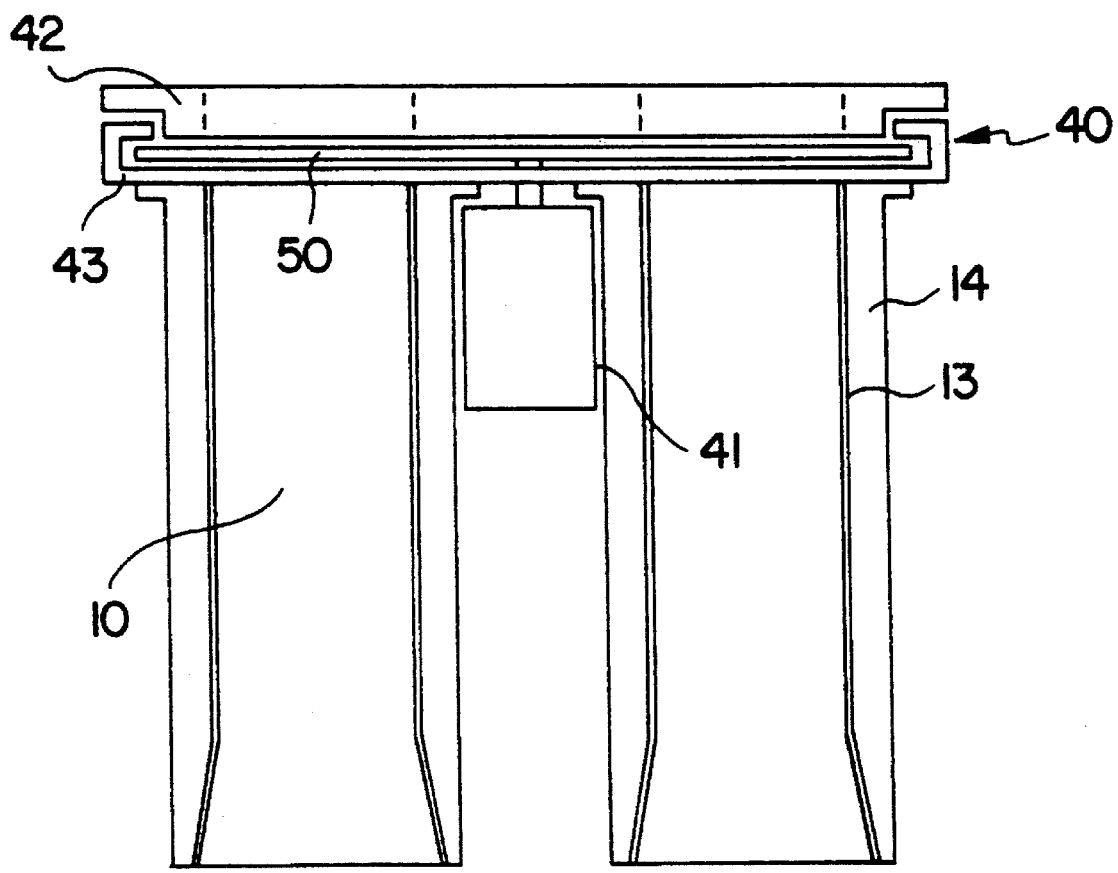
FIG. 2 shows a cross-sectional view of the pulse detonation combustors and the manifold/rotor assembly of the pulse detonation engine of FIG. 1.

FIG. 2 shows a cross-sectional view of the pulse detonation combustors 10 and the manifold/rotor assembly 40 of the pulse detonation engine of FIG. 1. Each combustor 10 is preferably in the form of an elongated cylindrical tube, with one end (the inlet end) attached to the manifold/rotor assembly. The combustors 10 are arranged concentrically about an axis of the cluster, with the lengths of the cylindrical tubes extending parallel to each other. The illustrated embodiment shows four combustors; however, the engine is not limited to this number.

The combustors 10 can be constructed of a carbon\carbon matrix 14. As shown in FIG. 2, the combustors 10 can have an inner coating 13 which can be, for example, ruthenium, arranged on the carbon/carbon matrix 14.

Figure 3A:
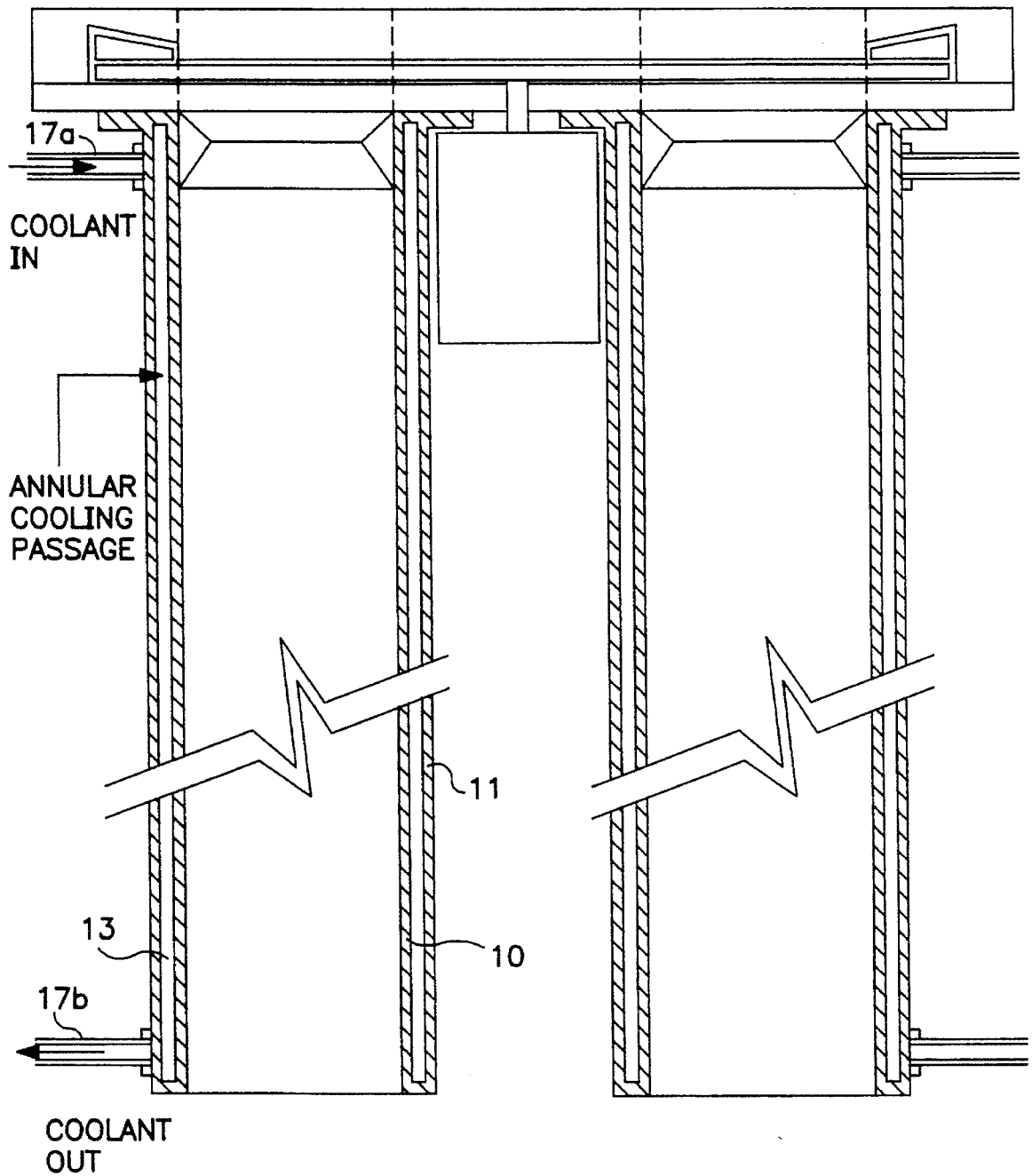
FIG. 3A shows a cross-sectional view of an embodiment of the pulse detonation combustors and the manifold/rotor assembly of the present invention, wherein the combustors include active cooling means.

Other constructions of the combustors 10 are within the scope of the present invention. For example, as shown in FIGS. 3A, 3AA, and 3B, each combustor 10 can include means for preventing heat degradation of the interior of the combustors, such as active cooling means, passive cooling means, or combinations of active and passive cooling means. Referring now to FIG. 3A, there is illustrated therein an embodiment of the pulse detonation engine in which combustors 10 include means for actively cooling each combustor. Disposed around the outside of each combustors 10 is a tube or sheath 11 concentrically disposed thereabout, and defining an annular cooling channel region 13. The second tube 11 and the combustor 10 are operatively disposed so as to define a cooling region 13 through which a coolant medium is adapted to circulate.

The coolant medium is adapted to be circulated between and around the combustor 10 removing heat from the immediately contacting interior region of the combustor 10. More specifically, the cooling channel region 13 is adapted to provide for the circulation of a coolant medium by a coolant pump (not shown) to maintain the combustor 10 at a uniform, relatively low temperature for preventing catastrophic failure of the combustion chamber walls, or pre-ignition of the fuel/air mixture. Coolant is allowed into and exhausted from the cooling channel region 13 by means of a coolant inlet port 17A and a coolant outlet port 17B. Coolant is pumped in via coolant port 17A from a reservoir of coolant (not shown).

An alternative embodiment is illustrated in FIG. 3AA, wherein the active cooling means consists of a relatively small tube 10A wrapped helically around the combustor 10 through which the cooling medium circulates. As with the embodiment of FIG. 3A, coolant is allowed into and exhausted from the cooling region 13 by means of a coolant inlet port 17A and a coolant outlet port 17B. Coolant is pumped in via coolant port 17A from a reservoir of coolant (not shown).

The coolant medium employed in the device can be either a gaseous or liquid coolant, and can vary depending upon, for example, combustion temperature, the width of the channel region 13 or diameter of tube 10A, and the degree of cooling required. In one preferred embodiment, the coolant is a liquid or gas coolant which is the same as the fuel used to fuel the combustion chambers. In this embodiment, a synergistic effect of preheating the fuel prior to being introduced into the detonation chamber is present and provides for more efficient use of fuel, since fuel temperature is closer to the detonation temperature resulting in more efficient consumption of the fuel during detonation. The concentrically disposed sheath 11 is affixed to the detonation chamber 10 at the top and bottom thereof to assure that no coolant material is allowed to leak out. This embodiment can be used advantageously in reusable engine applications.

Figure 3A:
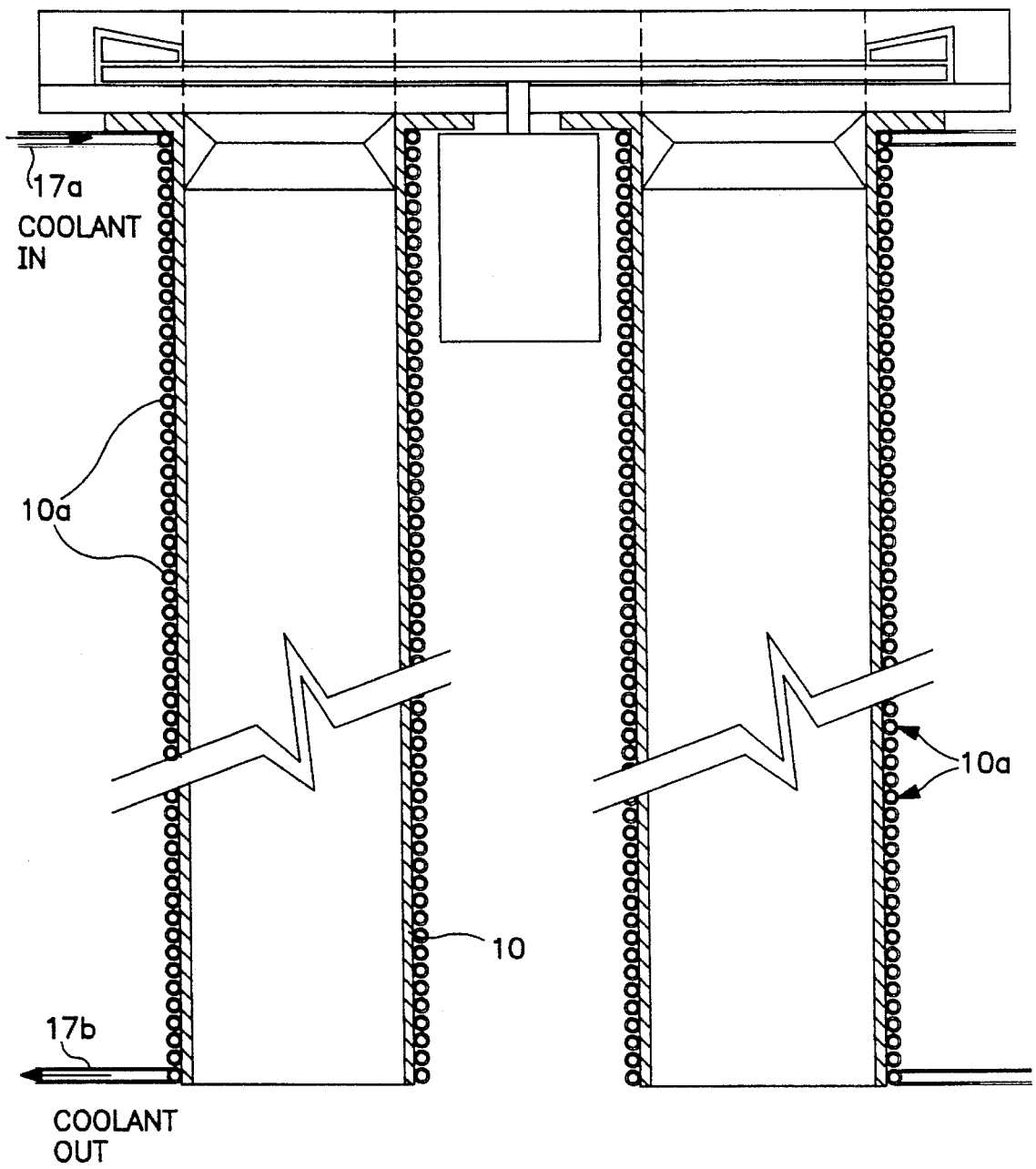
Figure 3B:
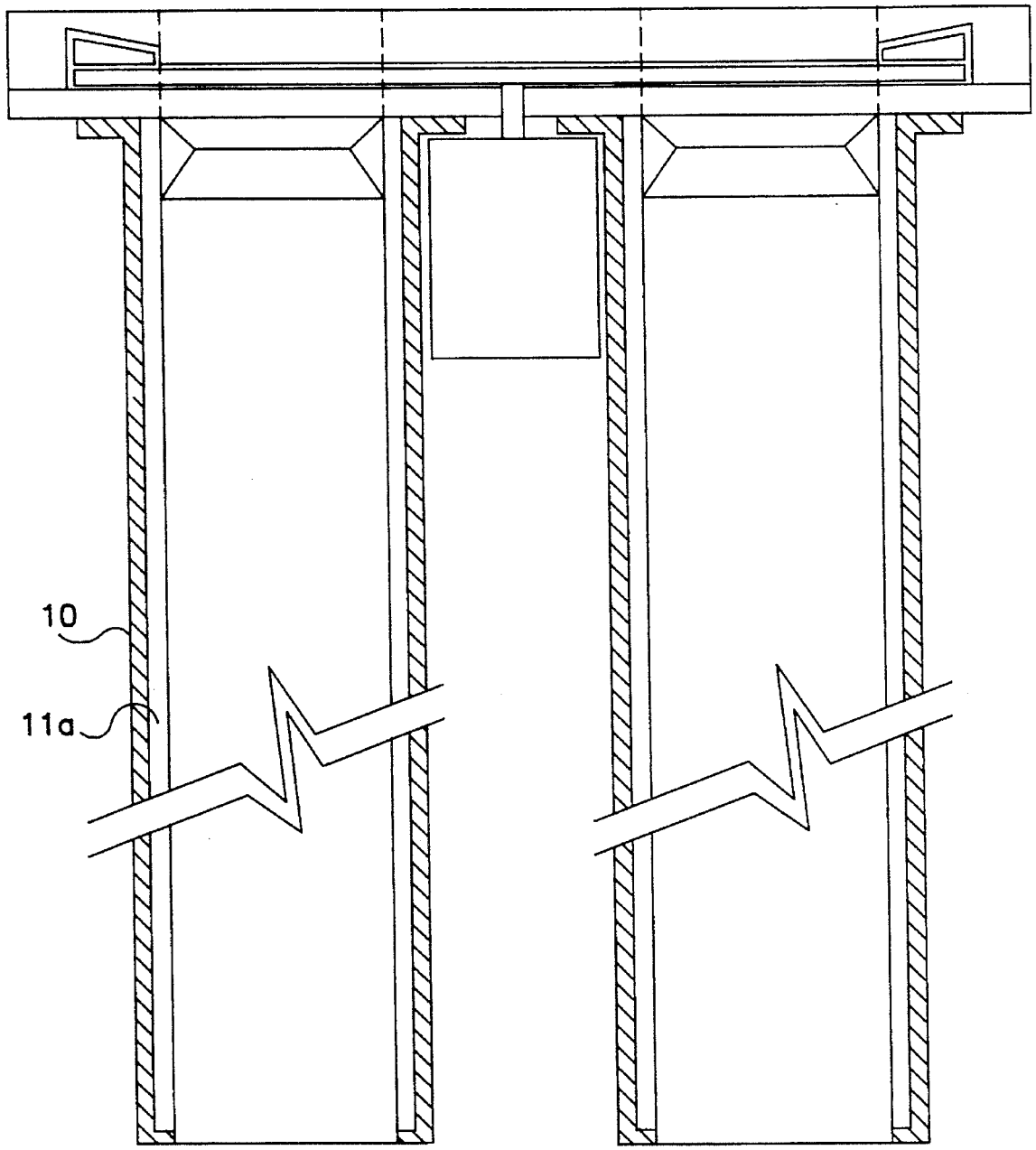
FIG. 3B shows a cross-sectional view of an embodiment of the pulse detonation combustors and the manifold/rotor assembly of the present invention, wherein the combustors include passive cooling means.

Referring now to FIG. 3B, there is illustrated therein a second method of cooling the combustor 10 wherein cooling is accomplished by a passive method. Specifically, FIG. 3B illustrates combustor 10 having a liner 11a which is adapted to be burned off as the combustion chamber is used. This method is known as an ablative method, and is used advantageously when the combustor 10 is used in an expendable application.

In this embodiment, the interior of combustor 10 is coated throughout the entire interior diameter of the chamber with a material designed to ablate below the fuel/oxidizer auto-ignition temperature of the fuel mixture in the combustor 10. The thickness of the material must be sufficient such that there will be material left on the interior diameter of the combustor 10 during the entire time during which detonation is taking place. Criteria to be considered in selecting the ablative material is its temperature of ablation, and its erosion rate under the temperatures to which it will be subject to in the detonation chamber. The ablative materials will also need to withstand the cyclical pressure regime generated by the pulse detonation engine.

A general category of materials which will work in this embodiment are known as phenolics, specific examples of which include: silica phenolic, graphite phenolic, asbestos phenolic graphite, cloth phenolic impregnated, and refrasil. Other categories of materials, and specific materials adapted to function as the ablative lining material include: epoxy-based materials, ablative plastics, and pyrolytic graphite.

Figure 4A:
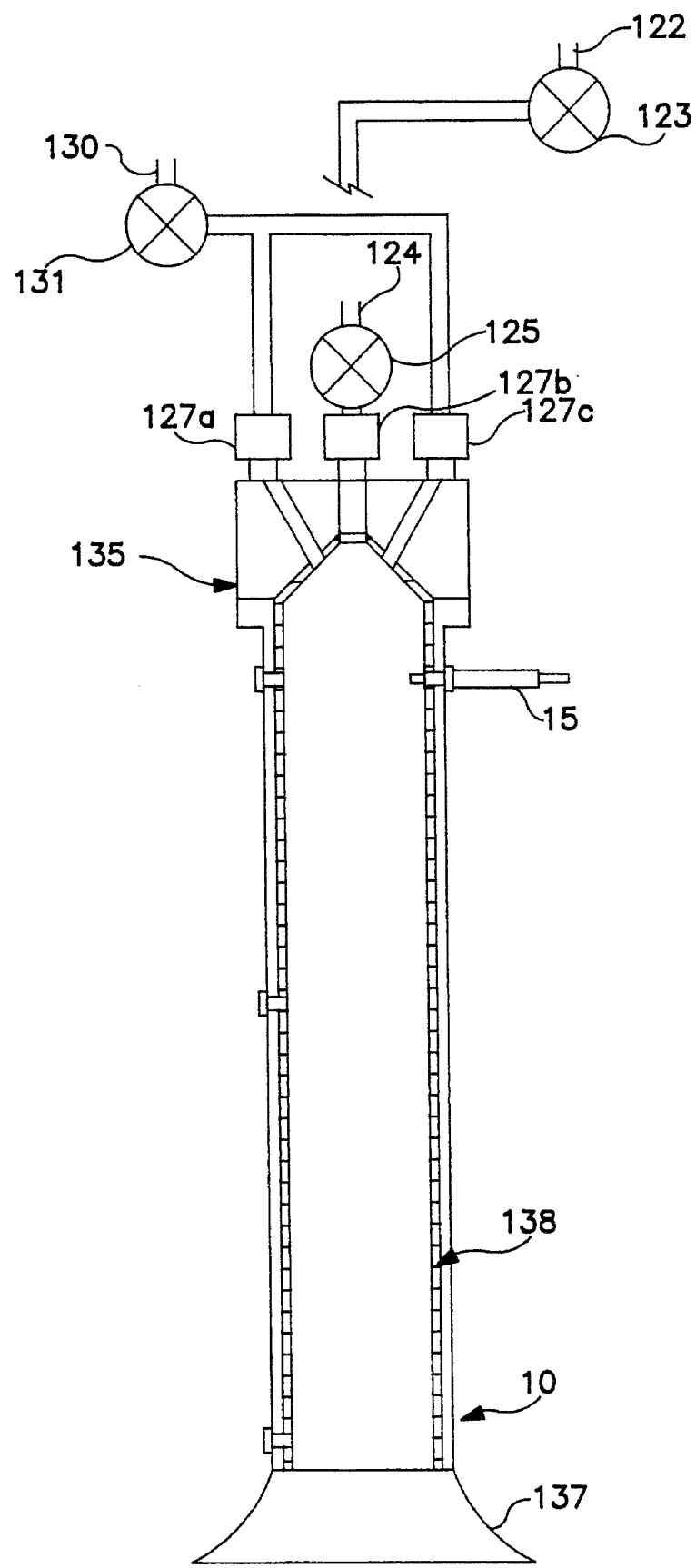
FIG. 4A shows a cross-sectional view of an embodiment of the invention having a single pulse detonation combustor, in which the combustor is a non-air breathing combustor.
Figures 4B, 4C:
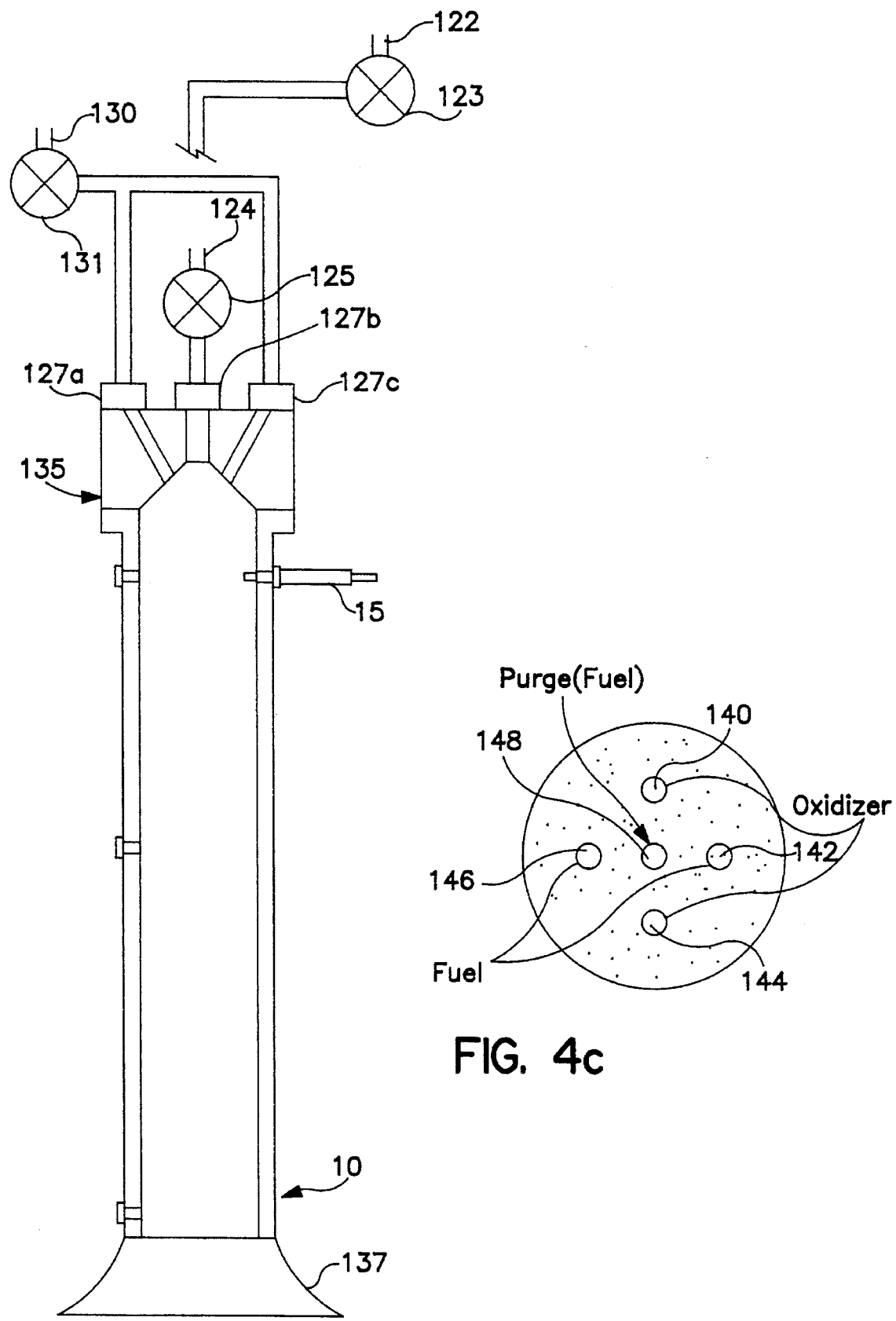
FIG. 4B shows a cross-sectional view of an embodiment of the invention having a single pulse detonation combustor, in which the combustor is an air breathing combustor.
FIG. 4C shows a top view of the fuel/air/oxidant injection head of the single-tube combustor illustrated in FIGS. 4A and 4B.

Referring now to FIGS. 4A and 4B, there is illustrated therein respectively, a single tube pulse detonation engine adapted for non-air breathing and air breathing applications respectively. Examples in which a non-air breathing application would be desired include rocket engines in which ambient air conditions are not available for contributing to combustion of fuel in the combustor chamber.

Heretofore, the pulse detonation engine described herein has been described with respect to a cluster of two or more combustors. It is to be understood that the instant invention will work advantageously with a single pulse detonation combustion chamber as illustrated in FIGS. 4A and 4B. The combustors 10 are fueled with fuel from a fuel manifold 130 controlled by solenoid valve 131. Depending upon the application for the combustor, different additives are added to the fuel in the combustor. For example, in non-air breathing applications, an oxidizer as described in detail below, is introduced into the chamber via oxidizer inlet duct manifold 122 and solenoid valve 123. After combustion, the chamber can be purged by fuel or oxidizer introduced via purge duct 124 and solenoid valve 125.

Alternatively, in air-breathing embodiments such as those illustrated in FIG. 4B, oxidizer is introduced along with fuel into combustor 10 via inlet duct manifold 122 and solenoid valve 123. The chamber is purged after combustion by the introduction of air (as opposed to fuel) through inlet air duct manifold 124 and solenoid valve 125.

The single tube combustors described hereinabove further include a conically shaped injector head 135 located at the top of the combustor. The conically shaped injector head 135 is adapted to provide impingement mixing of fuel, air, and/or oxidant introduced into the combustor 10. Other shapes of injector heads can be used with the invention. By impingement mixing, it is meant that fuel, air, and/or oxidizer are introduced in the combustor 10 at angles to one another thus enhancing mixing, and promoting more complete combustion of the fuel mixture in the combustion chamber. The conically shaped injector 135 further reduces recirculation of gases in the combustor 10, which facilitates the removal of burned gases between detonation cycles.

Each combustor 10 can further include a diverging nozzle 137 at the exhaust end thereof. The diverging nozzle is adapted to enhance performance of the combustor 10. The single tube combustion device shown in FIGS. 4A and 4B can further include either active or passive cooling as described above with respect to FIG. 3. For example, FIG. 4A illustrates a device having passive cooling means, specifically an ablative lining 138 as described with respect to FIG. 3B.

It is to be understood that the single tube pulse detonation devices illustrated in FIG. 4A and 4B can include additional elements. For example, the combustor 10 can include atomizer modules 127a, 127b, and 127c to atomize fuel, air, and/or oxidizer prior to introduction into the combustor. The combustor 10 can further include an igniter 15 as described elsewhere herein.

Referring now to FIG. 4C, there is illustrated therein a top view of injector head 135 of FIG. 4A and 4B. As can be appreciated from FIG. 4C, there are preferably a total of five inlet ducts 140, 142, 144, 146, and 148. Two, for example 140, and 144 are adapted to introduce oxidizer or oxygen into the combustion chamber. Two others, for example, 142 and 146, are adapted to introduce fuel into the combustor, and the final duct 148, arranged between ducts 140, 142, 144, and 146 is adapted to provide a purge material such as air or fuel depending on the application of the combustor 10. The number of inlet ducts can be varied, such as, for example, 7, 9, or other appropriate number.

FIG. 5 shows a bottom view of the pulse detonation combustors of FIGS. 1 and 2, showing the arrangement of the combustors about a common axis of the combustor cluster. A separate ignitor 15, which can be for example, a spark plug, is arranged near the inlet end of each combustor 10.

As an alternative to the spark plug 15 arranged near the inlet end of each combustor 10, a separate pre-detonation tube can be used to initiate detonation. This pre-detonation tube is shown as 18 in FIG. 1B. In an embodiment using this method, the separate pre-detonation tube can be constructed as a small tube above the manifold/rotor assembly 40. The pre-detonation tube is fueled with fuel and an oxidizer, and detonation is initiated therein by a suitable ignitor. The pre-detonation tube is constructed to fire into the main combustor 10 after the main combustor has been completely fueled. This embodiment is known as a staged pre-detonation.

Alternatively, air, fuel, and oxidant can be mixed together in the primary combustor 10 for a pre-detonation adapted to initiate the main detonation. This is known as a co-located pre-detonation. This co-located pre-detonation method can be achieved by injecting a region of fuel mixed with an oxidizer, and will be explained later with reference to FIG. 11.

The rotor disk valve 50 as shown in FIGS. 6 and 7 has two fueling port openings 51; however, the rotor disk valve is not limited to this number. The openings 51 are arranged circumferentially around the center of the rotor disk valve 50, so that as the disk valve rotates, the openings 51 are selectively positioned above the inlet ends of the combustors 10 for fueling. The distance of the openings 51 from the center of the rotor disk valve 50 corresponds to the distance of the inlets of the combustors 10 from the central axis of the combustor cluster.

In the illustrated embodiment, the openings 51 are arcuate in shape, defined by inner and outer concentric edges. The distance between the inner and outer edges (i.e., the width) of the openings 51 is selected for cooperation with the combustor inlets.

Solid portions 52 are arranged between openings 51 of the rotor disk valve 50. As the rotor disk valve 50 rotates, the openings 51 and solid portions 52 are alternately positioned above the inlet ends of the combustors 10. Thus, fueling of a combustor 10 occurs when an opening 51 is positioned over the inlet end, and a combustor can be fired when a solid portion 52 is positioned over the inlet end.

Rotor disk valve 50 can further include at least one, and in a preferred embodiment two oxidant port openings 53. In the fueling process (described in greater detail hereinbelow) it may be, in certain applications, advantageous to add oxidant to the top of combustor 10 to promote efficient detonation. The topping off should occur during the final part of the fueling process. Hence, fueling is accomplished as the fueling port openings 51 pass over a combustor 10. During the last part of the fueling process, oxidant port openings 53 open combustors 10 to admit sufficient amounts of oxidant to establish a pre-detonation zone in the combustor prior to detonation. The combustor is closed as opening 51 and 53 passes the combustor.

Figure 8:
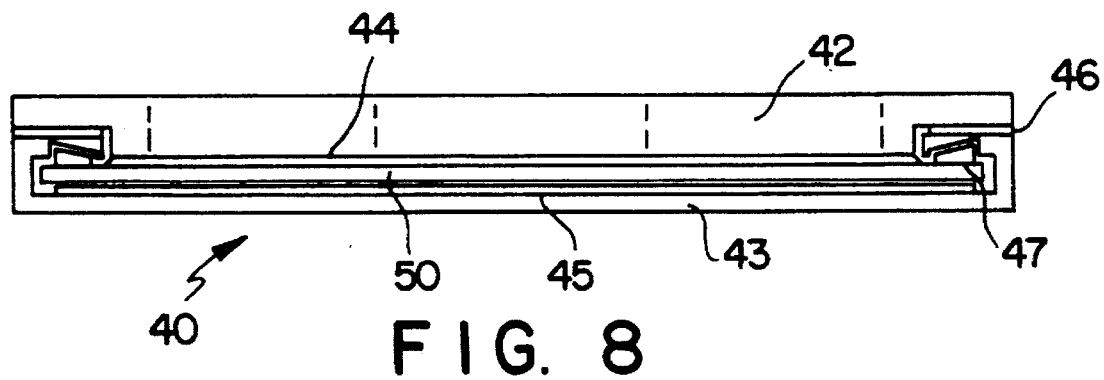
FIG. 8 shows a cross-sectional view of the manifold/rotor assembly of the pulse detonation engine of FIG. 1.
Figure 9:
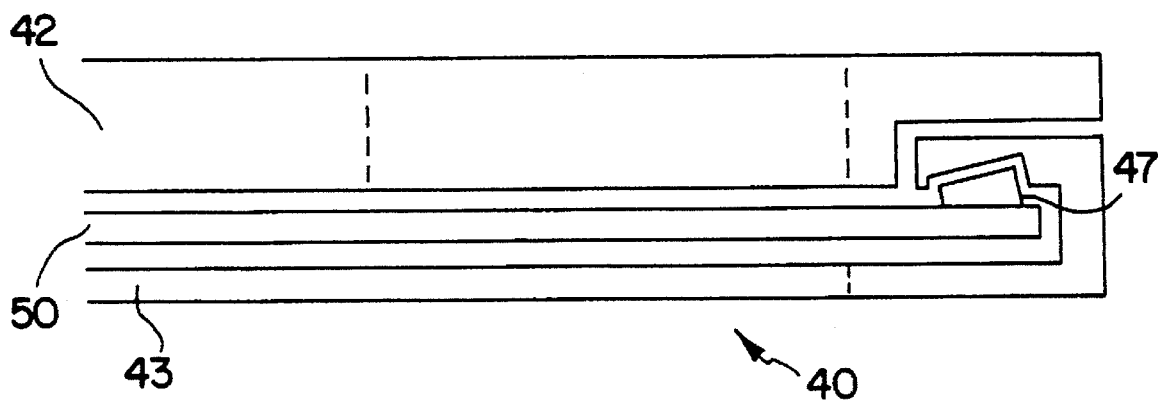
FIG. 9 shows an enlarged cross-sectional view of the manifold/rotor assembly of FIG. 8.

FIGS. 8 and 9 show cross-sectional views of the manifold/rotor assembly 40 of the engine of FIG. 1. The fuel/air manifold mounting plate 42 is located on the upper side manifold/rotor assembly 40 for coupling to the air manifold 20 and the fuel manifold 30. The lower combustor mounting plate 43 is positioned for coupling to the combustors 10. The rotor disk valve 50 is arranged between the upper fuel/air manifold mounting plate 42 and the lower combustor mounting plate 43. Each of the fuel/air manifold mounting plate 42, the lower mounting plate 43, and the rotor disk valve 50 can be constructed, for example, of titanium/zirconium/molybdenum or carbon/carbon.

Sealing elements 44, 45, and 46 are arranged between the parts of the manifold/rotor assembly 40. These sealing elements are arranged to prevent leakage of gasses. They can be constructed, for example, of solid graphite or suitable high temperature sealing material.

A series of tapered roller bearings 47 are positioned on the side of the rotor disk valve 50 away from the combustors 10. Forces from the detonation process within the combustors 10 on the rotor disk valve 50 are transferred via the bearings 47 to the manifold/rotor assembly 40. Thus, the bearings 47 allow transfer of pressure forces from the rotor disk valve 50 to the vehicle body during operation of the engine. Other bearing arrangements are possible within the scope of the present invention.

Figure 10:
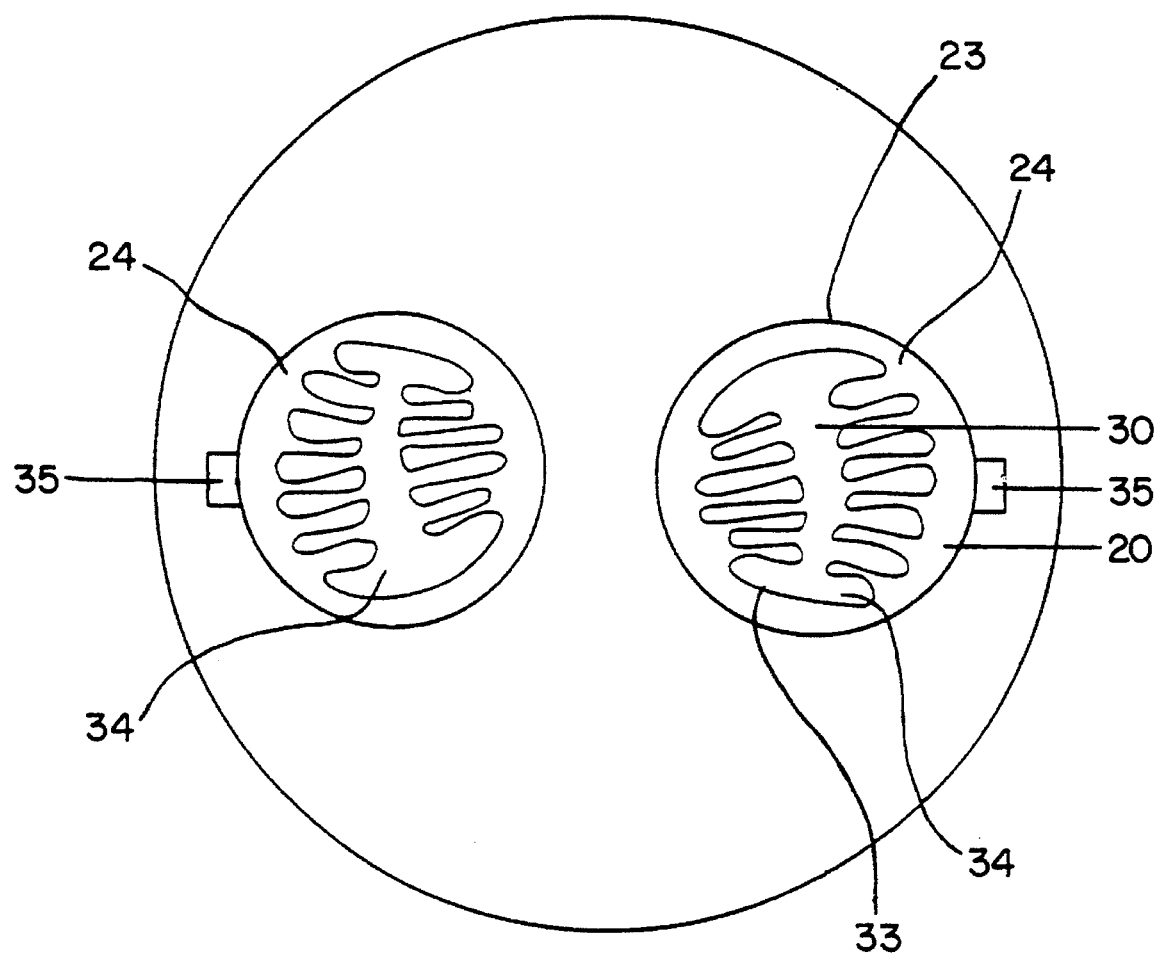
FIG. 10 shows a top view of the manifold of the pulse detonation engine of FIG. 1A.

FIG. 10 shows a top view of the upper manifold mounting plate with the fuel manifold 30 and the inlet air duct manifold 20, respectively. Fuel is distributed from the fuel generator to each combustor 10 through individual fuel ducts 34. Each individual fuel duct 34 has a finger-shaped cross-section and ends at a finger-shaped port 33 which opens into the corresponding combustor 10.

The individual fuel ducts 34 are arranged partially within individual air ducts 24. The individual air ducts 24 distribute air from the inlet air duct manifold 20 to the combustors 10. Each individual air duct 24 ends in a circular air port 23 which opens into the corresponding combustor 10. The finger-shaped fuel ports 33 are arranged within the air ports 23. It will be appreciated that this arrangement allows each combustor to be "topped off" with air after it is fueled.

Disposed adjacent to each air duct 24, on the side thereof closest to the outer circumference of the combustor 10, is a duct 35 adapted to allow oxidizer into the combustor 10. The oxidizer is adapted to produce a pre-detonation region in the combustor, thereby promoting efficient detonation.

The finger-shaped fuel ports 33 shown in FIG. 10 can be constructed so that they do not extend completely to either side of the air ports 23. Each fuel port 36 can be constructed to have an elliptical cross-section centrally located, and completely within the respective air port 23. It will be appreciated that when the fuel port 36 is displaced from the leading edge of the air port 23 the combustors 10 can be flushed with air prior to fuelling.

Having described the various components, the operation of the inventive pulse detonation engine is as follows. Fuel is distributed from the fuel source in a steady mode, and the air enters the inlet air duct manifold also in a steady mode. Rotor drive motor 41 rotates the rotor disk valve 50 between the fuel/air manifold mounting plate 42 and the lower mounting plate 43.

It will be appreciate by one skilled in the art that when liquid fuel is used, as illustrated in FIG. 1B, the fueling of the combustors will occur through liquid fuel lines 72 and fuel injectors 73. The operation of the rotor disk valve 50 will serve to selectively fuel the combustors in essentially the same way as a gas or solid fuel engine as described below.

In the fueling arrangement illustrated in FIGS. 6–10 corresponding to the engine shown in FIG. 1A, as an opening 51 of the rotary valve 50 moves into position over the inlet end of a combustor 10, air and fuel enter that combustor through the corresponding port 24, 34. As the rotor disk valve 50 continues to rotate, the trailing edge of the opening 51 closes off the finger-shaped fuel port 33, while air continues to enter the combustor 10 through a portion of the circular port 23 which remains open. Thus, the fuel-air mixture in the combustor is "topped off" with air, and any gaps that may exist in the system are filled with air. The air acts as an additional insulation buffer to protect the rotor assembly and prevent pre-ignition of neighboring combustors.

Figure 11:
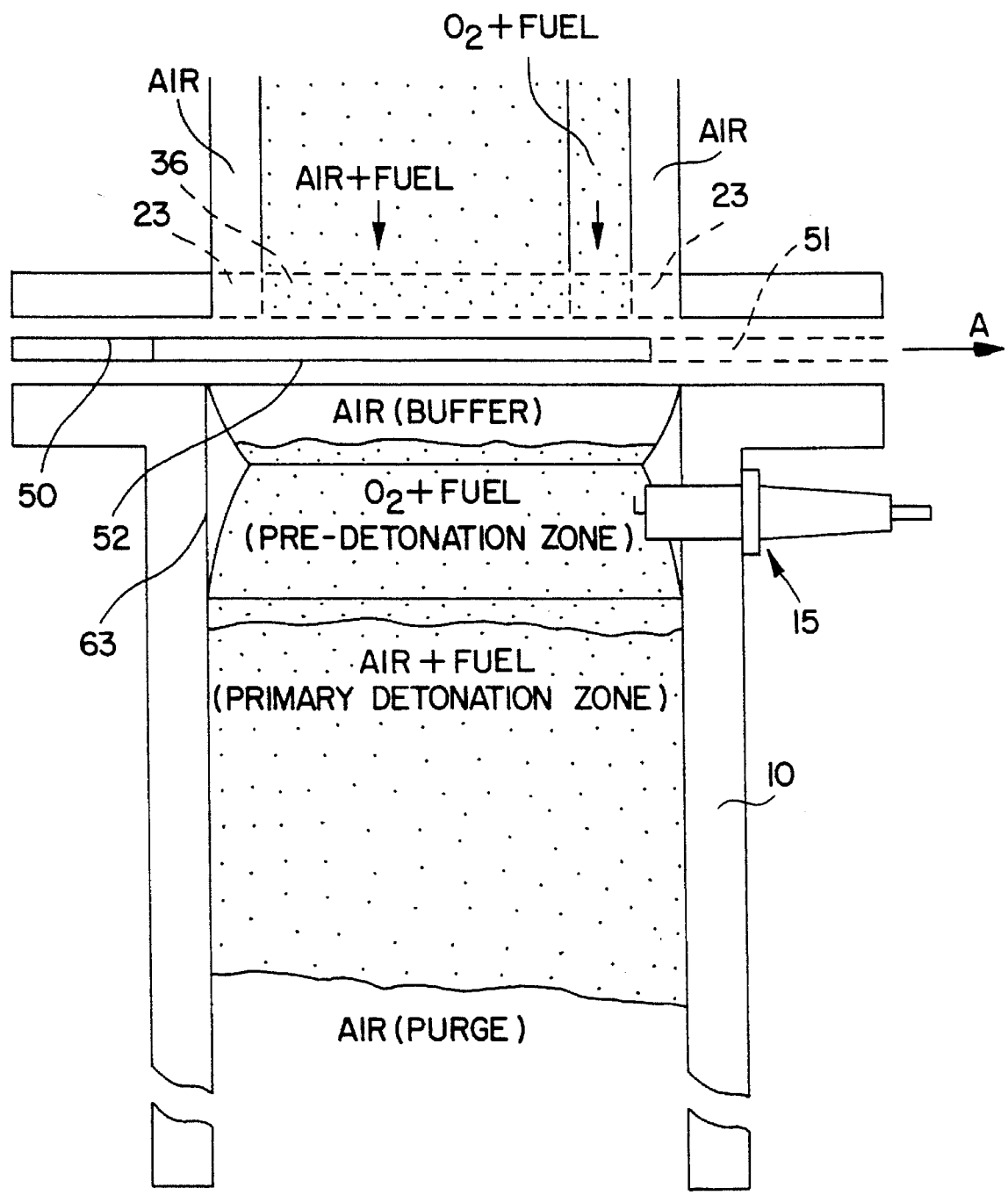
FIG. 11 shows a cross-sectional view of a combustor tube during fueling.

In the embodiment illustrated in FIG. 11, the fuel port 36 is constructed so that it is displaced from the edge of the air port 23 at either end. With this construction, the combustor 10 can be purged with air before fueling and topped off with air after fueling.

The combustor 10 in FIG. 11 is shown just prior to closing of the rotor valve 50. The rotor valve 50 rotates in a direction shown by the arrow A. In FIG. 11, an opening 51 has almost completely past over the inlet end of the combustor 10.

The zones illustrated in the combustor 10 of FIG. 11, depict the areas that result from the fueling arrangement. When the leading edge of the opening 51 of the rotor valve 50 first opened the inlet of the combustor 10, air (from the left most region shown at the top of FIG. 11) entered the tube to flush the combustor of any remaining burned gases from the previous cycle. This air is shown as the purged region at the bottom of FIG. 11.

As the rotor valve 50 continued to rotate, the opening 51 was positioned below the air and fuel ducts, thereby creating the primary detonation zone illustrated in the center of combustor 10. Continued rotation of the rotor valve 50 open an oxidizer duct connected to the oxidizer generator 35. In the illustrated embodiment, oxygen is used as the oxidizer, but other suitable oxidizers can be used. The introduction of oxidizer created the pre-detonation zone illustrated adjacent spark plug 15 in FIG. 11. Various fuel sensitizers can also be used to increase the detonability of the fuel mixture. The fuel sensitizer can be mixed with the fuel in the fuel tank or added to the fuel after it leaves the fuel tank.

As the rotor valve 50 neared closing and reached the position shown in FIG. 11, the opening 51 allowed only air (from the right most region shown at the top of FIG. 11) to enter the combustor 10. This created the buffer region illustrated at the top of the combustor 10, thereby topping off the fueled combustor with air.

With continued rotation of the rotor disk valve 50 past the position shown in FIG. 11, a solid portion 52 between openings 51 is positioned to close off the inlet end of the fueled combustor 10. In the illustrated embodiment the igniter 15 corresponding to the fueled combustor 10 is then fired in the pre-detonation zone to initiate detonation. Other methods of initiating detonation, for example an arc jet, or laser can be used.

Upon detonation, pressure forces will act upon all inner surfaces of the combustors 10. The pressure differential from the inlet end to the outlet end of each combustor 10, acting upon the rotor valve 50, will contribute to the thrust of the vehicle. The combustors 10 can be tapered so that pressure along the lateral inner surfaces of the combustors will contribute to thrust. The transfer of the pressure forces from the rotor plate 50 to the vehicle structure occurs through the bearing load transfer system 47. Thrust can be controlled by varying the spark igniter timing, valve rotation rate, and fuel injection rate, for example, through a microprocessor controller.

It will be appreciated that while one set of combustors is being fired, another set of combustors is being fueled with fresh fuel-air mixtures. As the rotor disk valve 50 seals a set of opposing chambers for detonation, it also opens the adjacent chambers for recharging.

The detonation cycle of the pulse detonation combustors 10 of the present invention can be described according to the fundamental processes that occur within the combustors. The pulse detonation combustor cycle is comprised of several distinct events or processes:

A. The detonation chamber is charged with fuel-air mixture;

B. The rotary valve seals the fuel chamber, and detonation is initiated at the closed end;

C. A detonation wave travels through the closed chamber;

D. The detonation wave exits, and burned gasses are exhausted; and

E. The rotary valve opens the chamber, and the chamber is recharged (while adjacent detonation chambers are fired).

The processes occurring within a single chamber 10 will be explained with reference to FIGS. 12 through 19, which shows successive steps in the combustion process of the pulse detonation engine of FIG. 1. The processes illustrated in FIGS. 12–19 also describe the combustion process as it occurs in the single combustor embodiment of FIGS. 4A, 4B, and 4C. It will be understood, however, that fueling takes place via injector head 135 of FIG. 4, instead of the rotary valve/manifold arrangement of FIG. 1.

Figure 12:
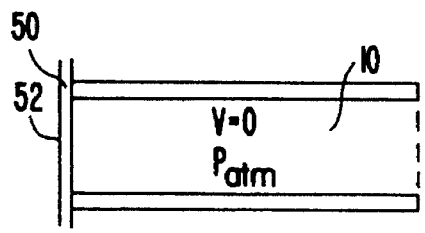
FIG. 12 shows a schematic representation of conditions within a combustor before fueling.

Initially, as shown in FIG. 12, the detonation chamber 10 contains gas at atmospheric pressure. A solid portion 52 of the rotary valve 50 seals the inlet end of the detonation chamber 10. At the start of the very first cycle, the chamber contains air at atmospheric conditions. In later cycles, at the start of the cycle, the chamber will contain a combination of air and unexhausted detonation products. In those later cycles, the chamber will be at atmospheric pressure, but the temperature can be somewhat greater than atmospheric due to the presence of burned gas (unless complete aspiration has occurred).

Figure 13:
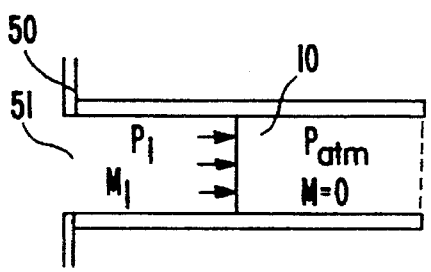
FIG. 13 shows a schematic representation of conditions within a combustor during fueling.

As shown in FIG. 13, the rotary valve 50 will be rotated to position an opening 51 over the inlet. As the valve is opened, a fuel-air mixture is introduced into the chamber 10. As described above, the chamber can be flushed with air prior to fueling. The velocity of the fuel-air mixture introduced into the combustor 10 can be adjusted in accordance with a combustor flow Mach number which will maximize engine performance. The pressure and temperature of the fuel-air mixture entering the combustor 10 is at P1 and T1, corresponding to State One.

Figure 14:
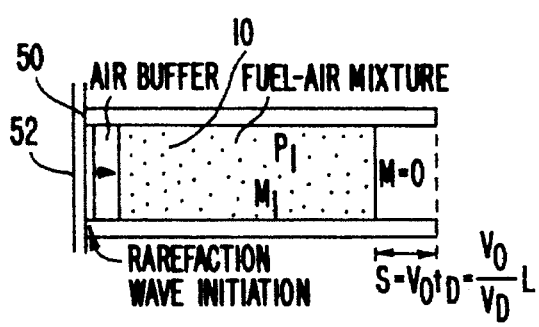
FIG. 14 shows a schematic representation of conditions within a combustor after fueling is complete.

As the valve 50 rotates toward sealing the combustor 10 it is designed to inject 1) a fuel/oxidizer mixture, and 2) a narrow air buffer at the top or closed end of the combustion chamber, as shown in FIG. 14. The fuel/oxidizer mixture serves as a pre-detonation region while the air buffer prevents strong shocks from propagating within the rotor valve assembly and causing neighboring detonation tube preignition. The buffer also serves to insulate the rotor from the high temperature detonation products.

As shown in FIG. 14, once the combustor 10 is fueled and topped off by an air buffer, the rotor disk valve 50 rotates to seal the combustor chamber 10 in preparation for detonation initiation. Solid portion 52 of the valve 50 fully closes the combustor chamber when the downstream fuel-air mixture is still at some finite distance from the open end of the chamber. The valve timing ensures that the fuel-air mixture and the detonation wave reach the combustor exit simultaneously, thus preventing any of the mixture from escaping unused. For a point design, the length of the detonation tube near the exit which is not filled with fuel is calculated from the overall length of the tube and the relative velocities of the fuel-air slug and detonation wave.

Figure 16:
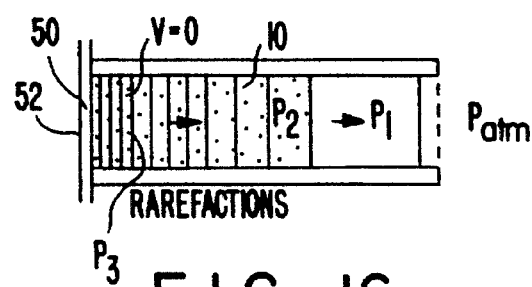
FIG. 16 shows a schematic representation of conditions within a combustor during the propagation of a detonation wave.
Figure 15:
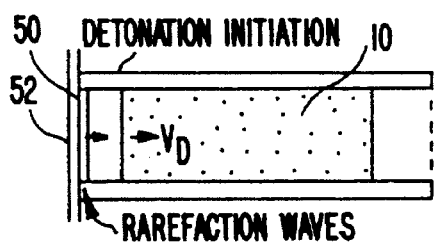
FIG. 15 shows a schematic representation of conditions within a combustor at the initiation of detonation.

FIG. 15 shows a detonation wave initiated immediately after the valve closes, in the fuel-oxidizer mixture region near the closed end of the chamber and just beyond the air buffer region. As the detonation is initiated, an expansion zone is created at the closed end. Rarefaction waves illustrated in FIGS. 15 and 16 are generated at the closed end of the detonation chamber and proceed toward the exit. The rarefactions originate at the closed valve according to the constraint that the fluid's velocity is zero at the closed end.

The rarefaction wave strength is determined by the amount of energy required to satisfy that constraint and decelerate the burned gas behind the detonation to zero velocity at the closed valve face.

There are two contributions to the momentum of the burned gas: one from the initial transverse momentum of the fuel-air mixture during injection, and another from the momentum imparted to the burned gas as it is accelerated by the detonation. Even though the burned gases move away from the detonation wave at the speed of sound relative to the wave (Chapman-Jouguet conditions), their velocity will be in the direction of the exit with respect to the chamber walls.

The detonation will proceed toward the open end of the chamber at the Chapman-Jouguet detonation velocity (V1) or Mach number (M1) corresponding to the temperature and pressure at State One. The region ahead of the detonation will contain the unburned gas at State One (T1, P1). Just behind the detonation wave, the burned gas will be at significantly higher temperature and pressure (State 2). Near the inlet or closed end of the detonation tube, the burned gas will be at a somewhat lower temperature and pressure (State 3) than the burned gas immediately behind the detonation. This is due to the expansion resulting from the rarefaction waves generated at the closed valve which propagate downstream (toward the exit) behind the detonation wave. The remainder of the burned gas within the expansion region between the detonation wave and the closed end will be at some condition (T and P) between States Two and Three.

Figure 17:
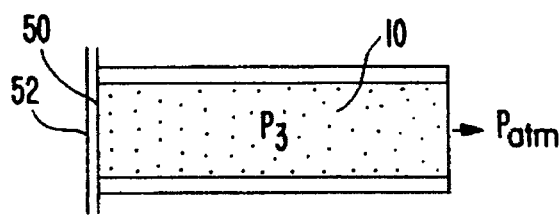
FIG. 17 shows a schematic representation of conditions within a combustor at the exit of a detonation wave.

When the detonation wave reaches the combustion chamber exit and exhausts, the chamber contains burned gas (i.e., combustion products) at elevated temperatures and pressures. Conditions vary along the length of the chamber from State 3 at the closed end to State 2 at the open end as the detonation exits, as shown in FIG. 17. Pressure increases from P3 at the valve to P2 at the open end. The velocity distribution varies accordingly from zero at the valve face, to a high velocity at the exit.

Figure 18:
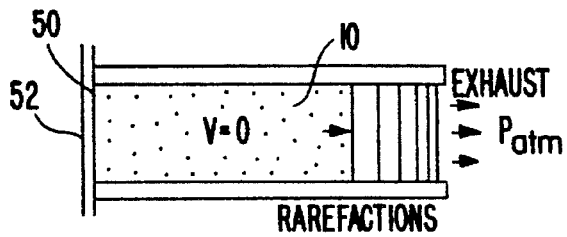
FIG. 18 shows a schematic representation of conditions within a combustor during the propagation of rarefaction waves and the exhaust of burned gases.

As the detonation exits the tube, a pressure differential of P2-Patm exists at the open end. As illustrated in FIG. 18, the pressure difference creates a series of rarefaction waves which propagate into the tube and expel the burned gas. The rarefaction waves travel into the tube at sonic velocity which varies with temperature. The temperature distribution varies along the length of the detonation chamber and decays with time as the burned gas is expelled.

Figure 19:
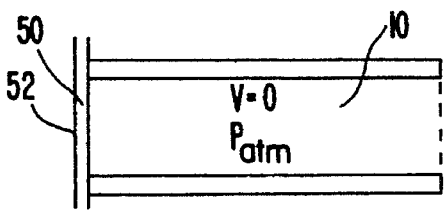
FIG. 19 shows a schematic representation of conditions within a combustor before refueling.

As the gas resident in the detonation chamber expands, the transverse pressure differential along the chamber diminishes with time. As shown in FIG. 19, chamber pressures eventually approach atmospheric and the exhaust velocity decays to zero. The chamber temperature can be somewhat greater than atmospheric due to the presence of burned gas (unless complete aspiration has occurred). The detonation cycle can then be repeated.

Figure 20:
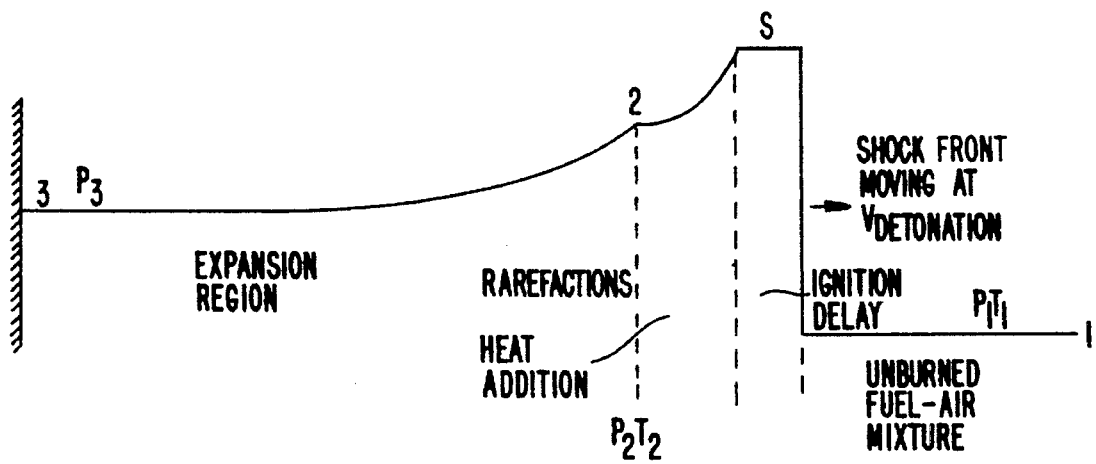
FIG. 20 is a graph showing pressure ratios as a function of detonation wave Mach number.

FIG. 20 shows the physics associated with a detonation wave created within a closed tube. The horizontal axis of FIG. 20 corresponds to the distance along the combustor. FIG. 20 depicts a stage in the detonation cycle corresponding to that shown in FIG. 16.

The detonation wave can be considered to be comprised of a strong shock wave, which triggers combustion, and a thin flame front or heat addition region just behind the shock. The shock front moves at the detonation velocity, V1 relative to the gas, and increases the pressure and temperature of the gas from its previous values of P1 and T1. An ignition delay region whose thickness is dictated by the reaction chemical kinetics exists just behind the shock.

Once the chemical reaction begins, heat is added to the flow and the pressure decreases from the shock front pressure. The thickness of the heat addition region is determined by the total time required to complete the fuel and oxygen reaction. At this point the burned gas is at State Two. In accordance with a detonative process, the temperature, pressure, and density at State Two are significantly greater than at State One.

In closed tube detonations, an expansion region exists behind the heat addition region. The furthest downstream location of rarefaction waves delineates the beginning of the expansion region. Rarefaction waves emanate from, and are most heavily concentrated at, the closed valve where the pressure P3 exists according to the zero transverse velocity boundary condition at the wall.

Figure 21:
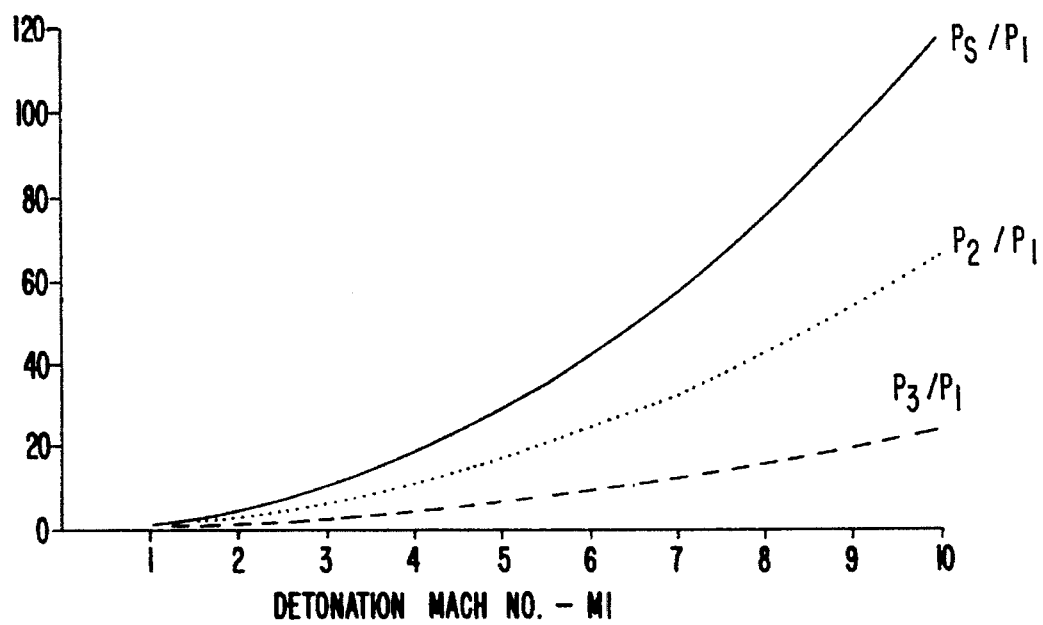
FIG. 21 is a graph showing pressure ratios as a function of detonation wave Mach number.

FIG. 21 shows the expected detonation pressure ratios as a function of detonation wave Mach number. Three pressure ratios associated with a detonation wave propagating in a tube within one closed end are depicted. $P_s$ is the pressure just after the initial shock from and before heat is added to the flow (i.e., in the ignition delay region). $P_2$ is the pressure just after the heat addition region, and is somewhat lower than the shock front pressure. Finally, $P_3$ is the pressure at the closed end of the tube. This value has been decreased substantially from $P_2$ as a result of the rarefaction waves behind the detonation wave.

One factor contributing to the characteristics of the detonation process is the method of fueling and selection of fuel. In addition to the use of solid fuel, described in detail below, liquid or gas fuel can be used in the present invention. Examples of liquid fuels which can be used in the present invention include, but are not limited to, liquid hydrogen and liquid hydrocarbons. A suitable gaseous fuel is, for example, hydrogen gas.

A preferred fueling arrangement of a pulse detonation engine according to the present invention uses a solid fuel gas generator, or pre-combustor, which produces a fuel rich gas mixture. The gas generator can be designed and operated in at least two different modes. In both cases, a fuel-rich mixture is generated, which when mixed with air from the primary inlets, is burned in the combustion chamber.

The first mode is based on a fuel mixture that incorporates just enough oxidizer to allow the fuel grain to burn or pyrolize. Control of the fuel flow is possible with a gas generator control valve located at the top of the gas generator.

The second mode, hybrid gas generation, uses air from a secondary inlet system to burn or pyrolize the fuel grain. The secondary air flow stream provides oxygen to promote burning of the fuel solid inside the hybrid gas generator. The burning liberates large quantities of unburned fuel which then forms the fuel-rich secondary flow stream. If the secondary air flow is varied, by bleeding for example, the rate of pre-combustion is reduced and the quantity of fuel-rich gas entering the combustion chamber is lowered. A smaller quantity of fuel in the combustion chamber decreases the stagnation temperature rise and results in a lower vehicle thrust.

The rate at which a fuel mixture is produced in either gas generator is related to the fuel solid regression rate. The regression rate is controlled by the rate at which heat is transferred from a reaction or a free stream zone to the pyrolizing wall. The decomposition mechanism is modeled using turbulent boundary layer theory. It predicts the magnitude and the form of the contributing effects and provides an estimate of the expected regression rates. Regression rates for solid fuels are typically determined experimentally.

The gas generator flow rate is controlled by a gas generator control valve, such as valve 32 shown in FIG. 1.

The choice of fuels with the desired detonation properties is an important aspect of detonation engine development. Example fuels for the present invention include, but are not limited to, acetylene, hydrogen, aluminum (solid or vapor), magnesium (solid or vapor), carbon and simple hydrocarbons, and possibly boron.

Boron has ideal energy content, but boron particles produced by a gas generator are usually coated with an oxide layer which must first be removed before the boron will ignite.

A fuel-rich gas based on aluminum can be generated without an oxide layer. The aluminum particle size should be kept below 10 microns to maintain a sustained detonation. Aluminum can also be generated as a vapor which will further enhance its detonability.

Magnesium can be generated as a solid or vapor suspension, and can be detonated. The magnesium particles or droplets must be approximately 10 microns or less to detonate.

Both aluminum and magnesium vapor suspensions have very favorable detonation properties. However, an undesirable property of the vapor suspensions is their tendency to condense on cold surfaces because of the relatively high melting points of the two metals. Condensation of aluminum and magnesium vapor can cause mechanical problems if it occurs on tightly-fitting parts with small gap tolerances. Alternatively the system could be heated by designing a gas generator fuel grain which first produces hot gas followed by the fuel-rich gases.

Carbon has an energy content similar to aluminum. Carbon can be generated as a solid suspension and will not condense on any engine surfaces.

To ensure the optimum condition for fuel-air detonation, the fuel and air must be thoroughly mixed to ensure the fuel concentration is within the detonability limit (i.e., near stoichiometric). The components must be mixed to length scales comparable to the detonation phenomena length scales.

Mixing can be characterized on several levels including macroscopic and microscopic scales. Macroscopic mixing refers to the bulk fluid processes which bring the fuel and air components to close proximity (e.g.,impingement of fuel and air streams). Microscopic mixing is the process by which the fuel and air are further mixed to a length scale required for detonation. Many techniques can be employed to produce microscopic mixing. However, care must be taken to minimize total pressure losses associated with these devices.

Several mixing strategies have been developed to ensure the necessary fuel-air conditions exist within the detonation combustors of the present invention. As illustrated in FIG. 11, an air impingement ring 63 can be used to direct the air stream to mix with the fuel. The ring 63 has a tapered surface so that the air introduced at a radially outward position is directed toward the fuel introduced at a radially inward position. It will be appreciated that the air impingement ring 63 also acts to direct air for "topping-off" the fueled combustor tube and for purging the combustor tube of remaining gasses after firing.

Figure 22:
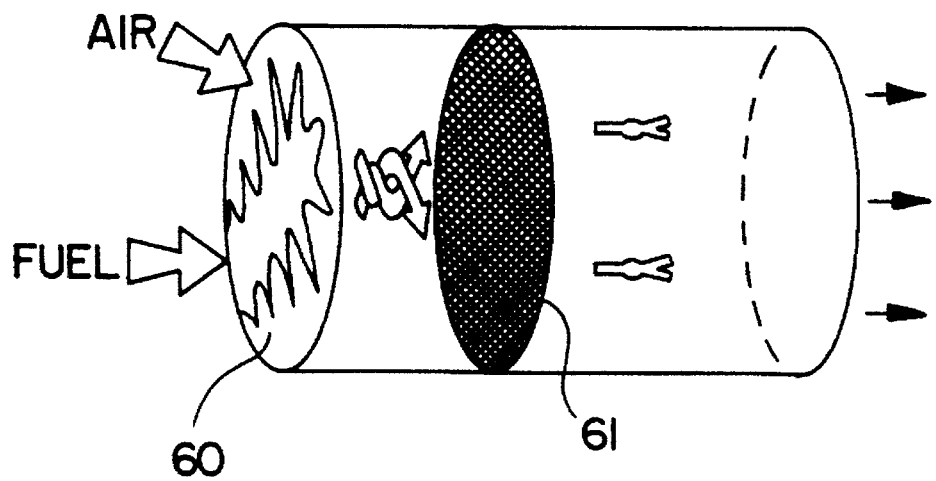
FIG. 22 shows a schematic representation of an embodiment of a mixing arrangement for use in the present invention.
Figure 23A:
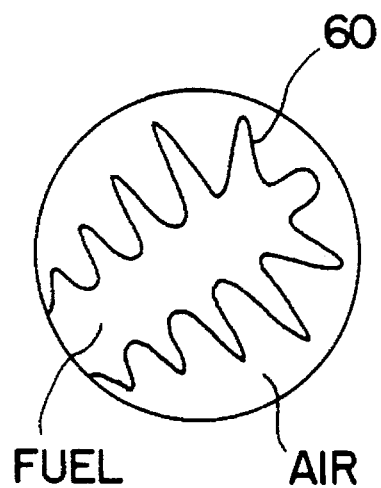
FIG. 23A shows a top view of the inlet vortex generator of the mixing arrangement of FIG. 22.
Figure 23B:
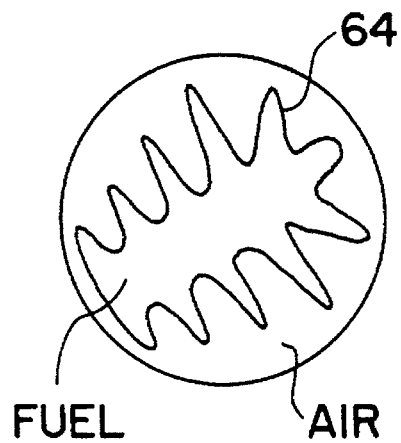
FIG. 23B shows a top view of an alternative embodiment of an inlet vortex generator.

As illustrated schematically in FIG. 22, when solid or gas fuel is used, fuel and air can be injected at the top of a detonative combustor through a serrated vortex generator 60 (macroscopic mixing) followed by a mixing mesh 61, impingement ring or mixing module (microscopic mixing). The components of this mixing arrangement can be located in the top zone of each detonation tube 10. A top view of the serrated vortex generator 60 is shown in FIG. 23A. FIG. 23B shows an alternative serrated vortex generator 64 in which the fuel port is displaced on both the leading and trailing edges from the edge of the air port.

Figure 24:
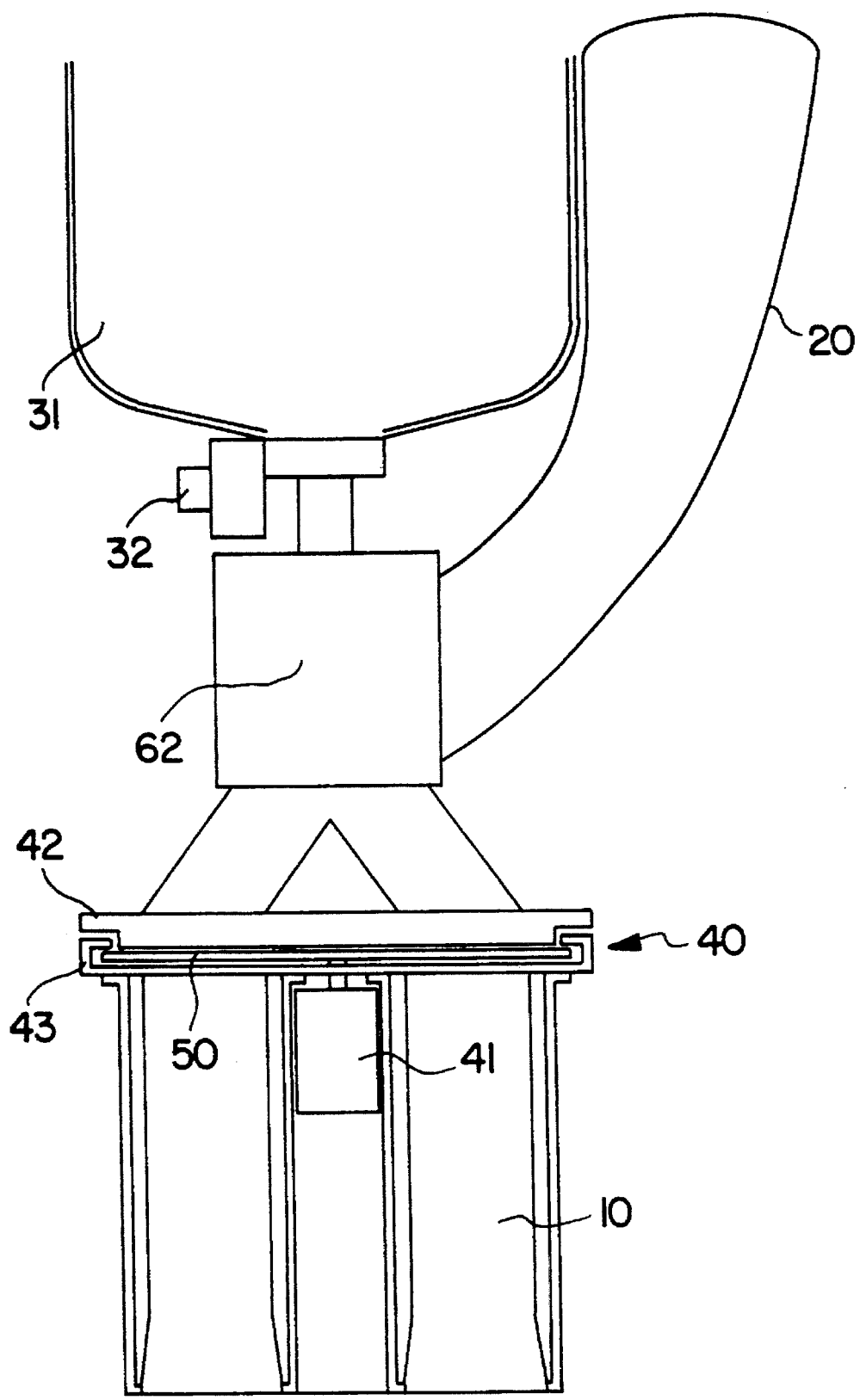
FIG. 24 shows a cross-sectional view of an alternative embodiment of the pulse detonation engine of the present invention, incorporating a pre-mixer.

Another mixing strategy involves mixing the fuel and air in a separate pre-mixer before injection of the fuel and air into the detonative combustors. FIG. 24 illustrates this concept, with the pre-mixer indicated by reference numeral 62. The primary problem related to the pre-mixing concept is the potential of preignition due to inadequate isolation of the mechanical elements of the engine. A variation of this strategy is to partially pre-mix the fuel and air to a fuel concentration level just outside the fuel-air mixture's detonability limits.

Electric power for the rotor plate motor, spark ignition system and other vehicle systems can be derived from several sources including batteries, inlet air or gas generator electric turbo generators, or a combination of these sources. Inlet air or gas generator systems consist of a turbine rotor, placed in either the air or gas generator flow, in order to drive a small electric generator.

Materials should be selected dependent upon anticipated operation conditions. It is expected that the engine material could be exposed to peak temperatures approaching 2500K and peak pressures of the order of 20–40 atmospheres. Pressures just behind the detonation wave's shock front (i.e., in the ignition delay region) are of the order of 40 atmospheres, and pressure ratios across the entire detonation region are of the order of 20 atmospheres. The mode of operation will also expose the structure to periodic variations of both a thermal and mechanical nature.

Components made from carbon/carbon or titanium/zirconium/molybdenum (or similar alloy) can be used in construction of the pulse detonation engine of the present invention. For example, the detonation tubes could be made out of a metal shell with an ablative liner. The rotor disk can be fabricated using carbon/carbon composites.

Carbon/carbon can be machined to tolerances which produce surface finishes approaching the smoothness of machined metal. Carbon/carbon has a very low thermal expansion coefficient and will allow the components of the engine to be assembled to very close tolerances, thus minimizing potential sealing problems. Carbon/carbon fibrous materials are manufactured by many companies.

Titanium/zirconium/molybdenum offers high temperature capability, is easily machined, and is available from many specialty metal suppliers.

Several methods for initiating a detonation cycle can be used. Detonation can be initiated by igniting a fuel-oxygen mixture in a small detonation tube which discharges into a combustor, or by igniting a fuel-oxidizer mixture co-located within the combustor. Alternatively, a high voltage electric discharge or pyrotechnic ignitor can be used. All three approaches can be effective given fuel detonation characteristics, certain energy and power constraints.

The small detonation tube method requires fuel, an oxidizer, pumps, high speed fluid valves, an electronic controller, a power supply and a spark generator. The direct electric discharge method requires a spark plug, electronic controller and a power supply. Pyrotechnic ignition is viable if a small solid rocket is fired systematically into each combustor (e.g., through a small rotor or cylinder valve) to initiate detonation.

The choice of ignition method is dependent on engine size and on the characteristics of the fuel used. In order to keep the design of the propulsion system as simple as possible, the direct electric discharge method coupled with a pre-detonator is preferred.

A pulse detonation energy generating system can be provided by the invention. Such a system has at least one detonation combustor selectively coupled to an air inlet and fuel source. Fuel, air, and an oxidizer can be fed to the detonation combustors either through a rotary valve or through a conically shaped injector head. Energy generated by detonating fuel, air and oxidant is converted to electrical energy.

A pulse detonation energy generator can include at least one detonation chamber. Each detonation chamber has an inlet end and an outlet end. A fuel manifold supplies fuel from a fuel source to the two or more detonation chambers at the inlet ends. An inlet air duct manifold supplies air to the two or more detonation chambers at the inlet ends. A means for initiating detonation is in the detonation chamber. A means for converting is included to convert into electrical energy the energy cogenerated by a detonation in the detonation chamber.

The pulse detonation energy generator can further include a rotor disk valve having at least one opening and at least one solid portion, wherein the rotor disk valve is positioned between the inlet ends of the detonation chambers and the fuel and air manifolds. The rotor disk valve rotates so that the opening is positioned over the inlet end of one of the at least two detonation chambers to allow fuel and air to enter the detonation chamber. The rotor disk valve further rotates so that the solid portion is positioned over the inlet end of the detonation chamber so that the fuel and air inside the detonation chamber can be detonated by the detonation source. The fuel source can be a solid fueled gas generator, a liquid fuel source, or a gas fuel source.

A pulse detonation energy generator can include a pre-detonator having a separate pre-detonation tube fueled with fuel and an oxidizer and is constructed to fire into the one or more detonation chambers to initiate detonation. The energy conversion means can include a jacket disposed around the detonation chamber to enclose an energy transfer medium. The energy transfer medium can be a gas, such as air, or a liquid. An electrical generator can be powered by the energy transfer medium.

The pulse detonation combustor (PDC) can substantially improve natural gas combustion thermal efficiency by approximately 30 percent to 50 percent as compared to current or projected natural gas combustors, such as steady state and pulse combustors. The natural gas combustor detonates a natural gas/air mixture with a pre-detonation system. Detonating the fuel/air mixture greatly improves the thermal efficiency of the combustion heat release process compared to deflagrative combustion. The high efficiency of detonation combustion results from the fact that it is a constant volume process, unlike deflagrative combustion which is a constant pressure process. The detonation combustor is mechanically simple, compact, produces reduced levels of NOx, has improved heat transfer capabilities, and is extremely efficient.

Figure 25:
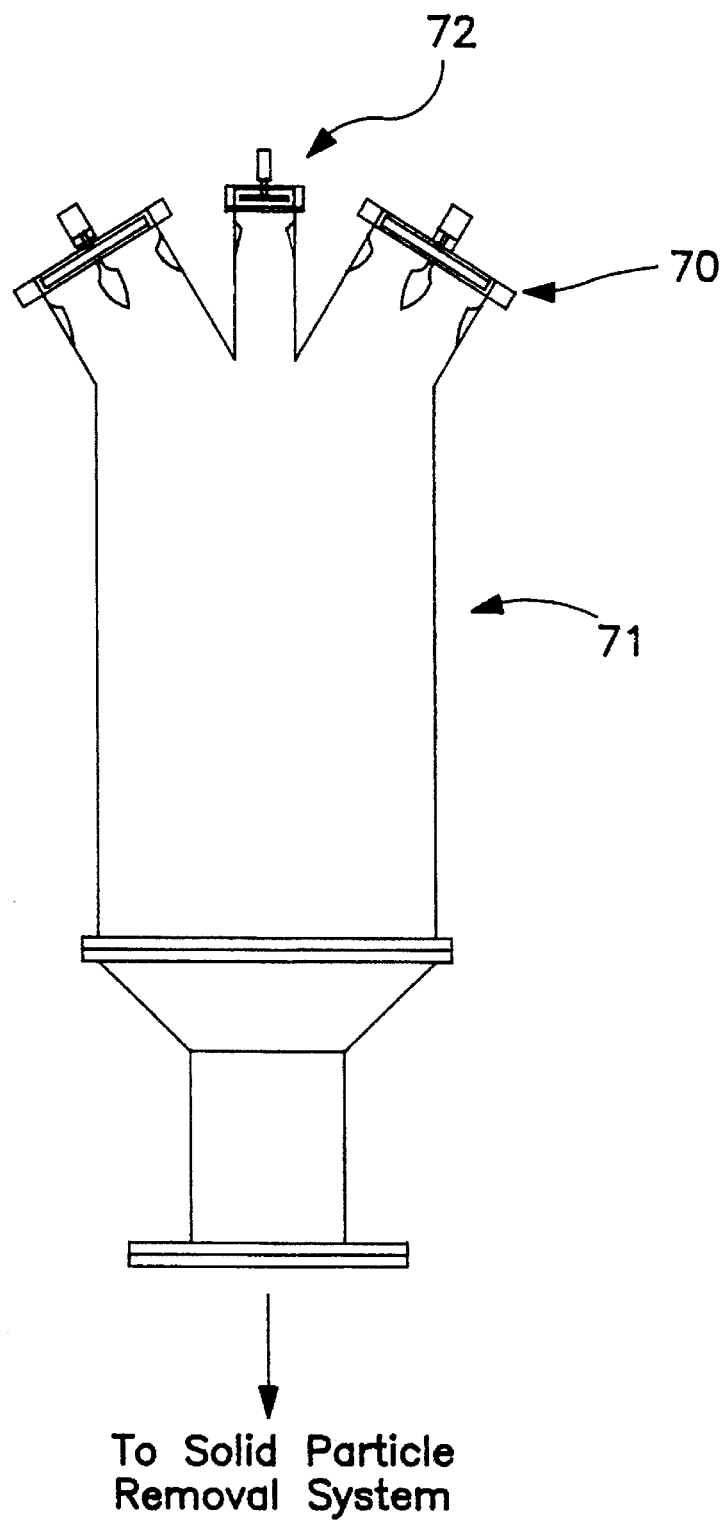
FIG. 25 shows a side view of one embodiment of a pulse detonation combustor.

FIG. 25 illustrates a pulse detonation combustor (PDC) device. The basic components include the fuel/air injector valves and mixing chambers 70, the detonation initiator, the primary combustion chamber 71, and the nozzle/exhaust mechanism. The pre-detonation chamber 72 serves to directly initiate the primary detonation of the fuel/air mixture in the main chamber. The fuel and air is metered by a rotary valve (other valve arrangements are possible, e.g., flapper, fast-acting ball valve, electrically activated solenoid) and injected into the fuel/air mixing chamber 70 where they are mixed to the microscopic length scales required for detonation by impingement mixers.

Figure 26:
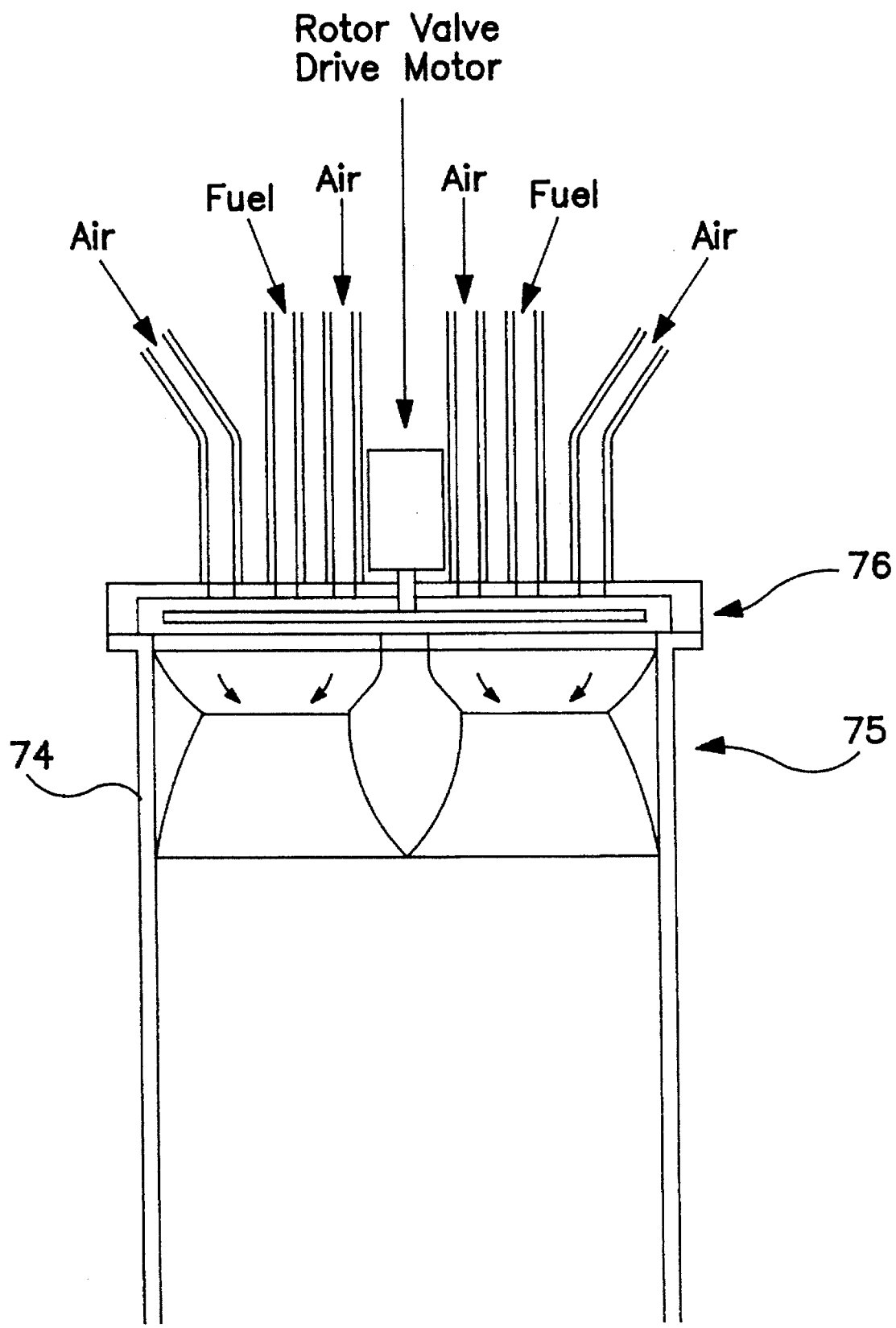
FIG. 26 shows a cross-sectional view of one embodiment of a rotor valve drive motor.
Figure 27:
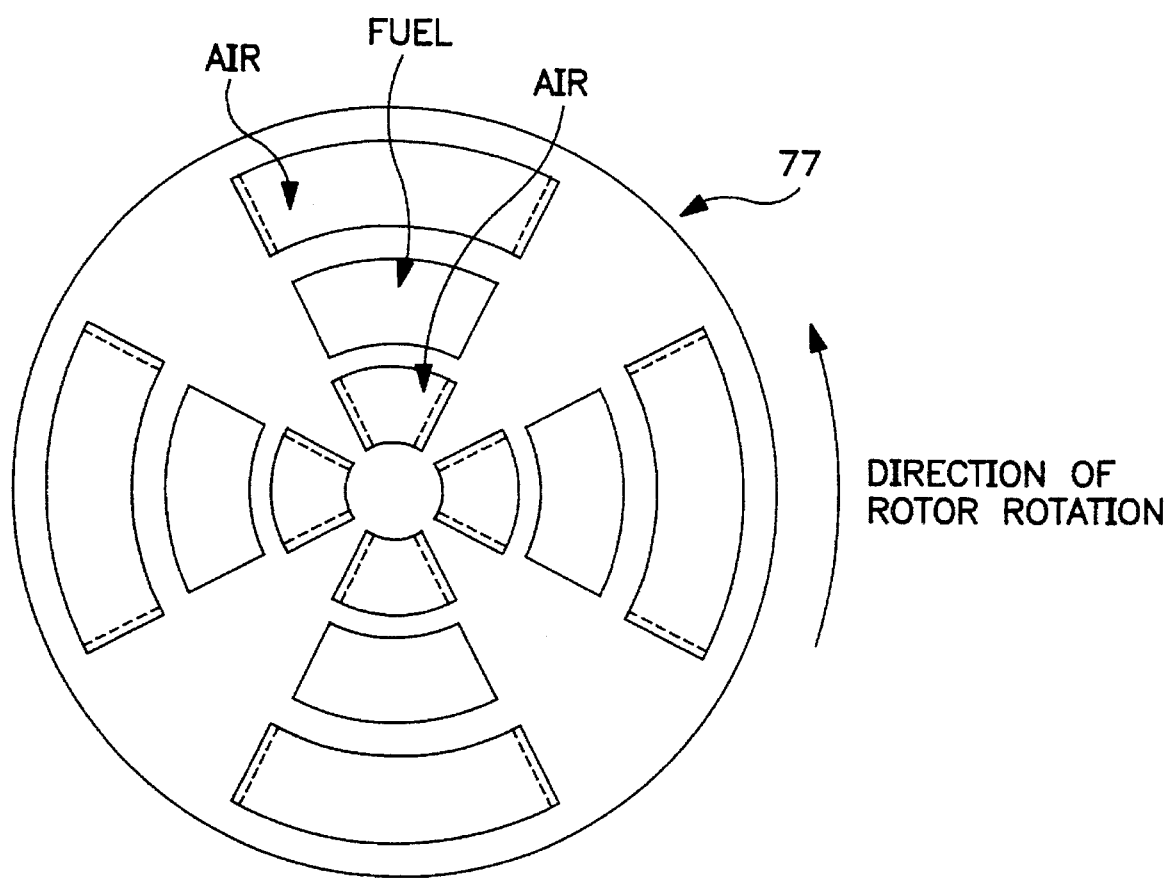
FIG. 27 shows a cross-sectional view of one embodiment of a primary fueling port.

FIG. 26 shows a side view of a fuel/air injector/mixer 74. The impingement mixers 75 include an impingement ring and center lobe which force air into the fuel stream. Macroscopic mixing occurs through the multiple fuel and air injector ports in the rotary valve assembly 76. The rotary valve serves several functions, including initially admitting only air to purge the system of hot gases, introducing both fuel and air for primary detonation, and finally admitting an air buffer to "top off" the injector/mixer in order to isolate the rotor assembly from the detonation wave. To accomplish these different fueling states, the rotary valve disk has a series of different sized openings. Each is sized to accomplish its particular function. FIG. 27 illustrates a rotary valve disk 77 for a four port injection system. Once the main combustion chamber 71 is fueled, the valve is closed and the mixture detonated. The rotary valve is mechanically simple and easily controlled, allowing the frequency of the combustion to be closely regulated.

Figure 28:
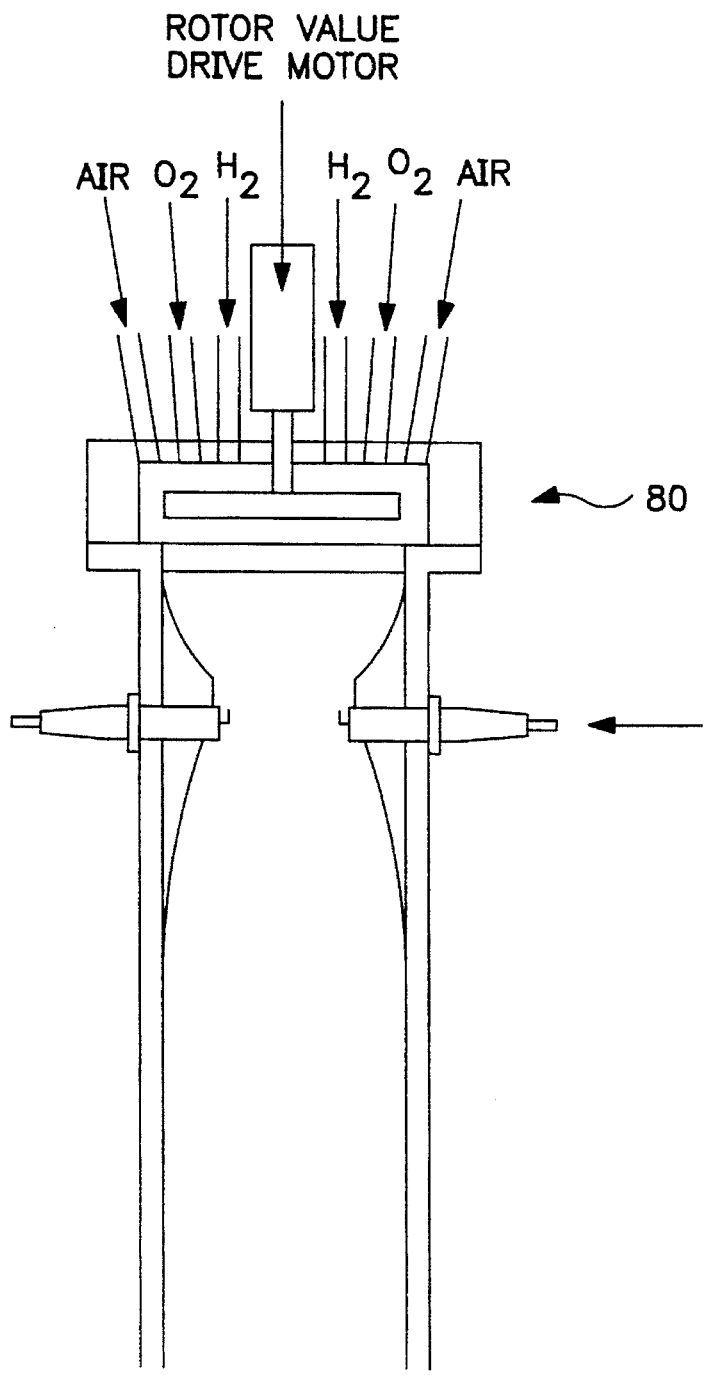
FIG. 28 shows a cross-sectional view of one embodiment of a pre-detonation chamber.

Detonation is initiated in the device with a pre-detonator, or a tube extension in which deflagration-to-detonation transition (DDT) can take place. A pre-detonator is positioned before the main detonation tube. FIG. 28 depicts a pre-detonator which uses a rotary valve 80 for flow metering. The detonation initiation tube contains a highly sensitive (i.e. readily detonable) mixture such as hydrogen and oxygen.

Figure 29:
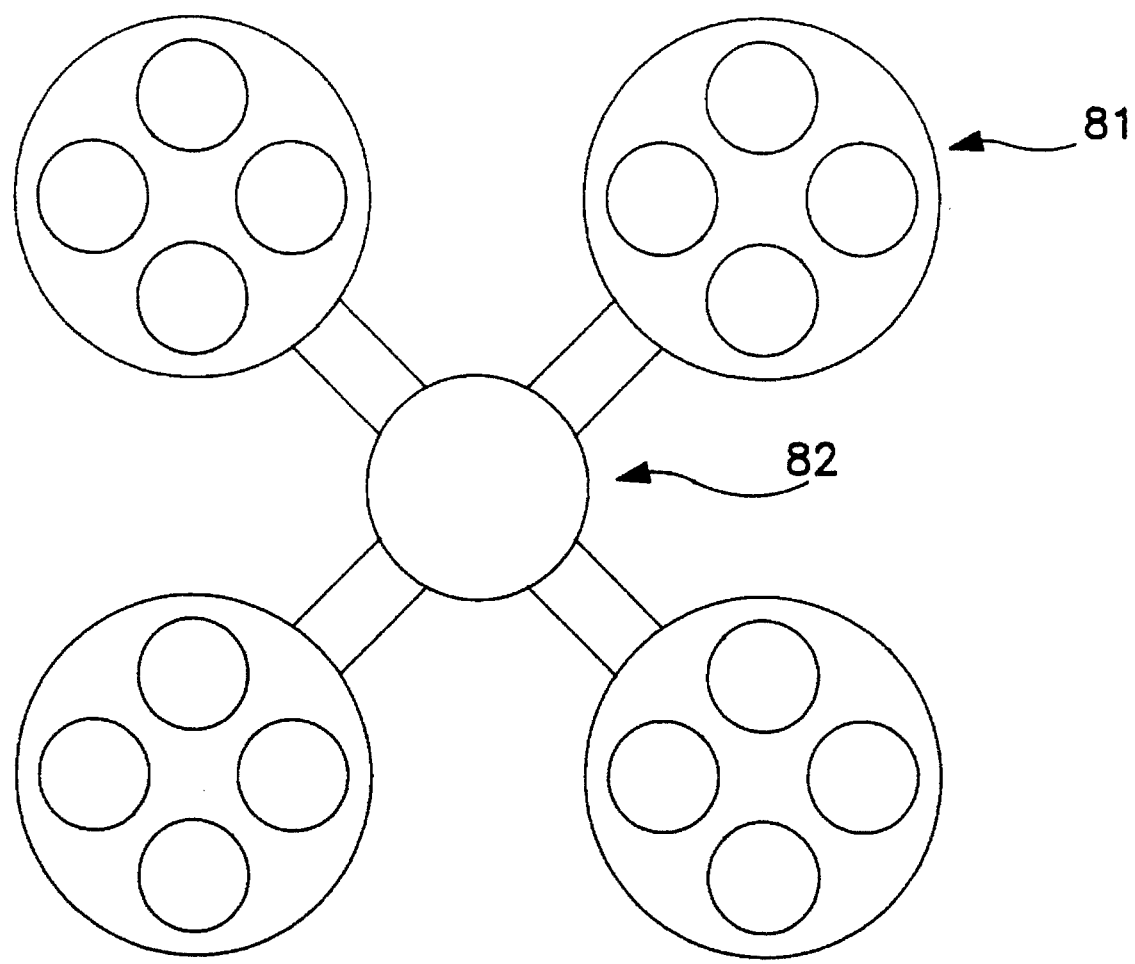
FIG. 29 shows a top view of one embodiment of multiple pulse detonation combustors driving a common turbine.

The hot gases, during operation of the device, expand out of the combustion chamber through a nozzle and progress through a conduit to a turbine, which generates electricity. If the temperature is excessive for optimal turbine operation, a heat exchanger is coupled to this conduit to transfer some of the heat to steam. A steam turbine can then be utilized to recover useful energy from the steam. A similar device is used to capture any heat remaining in the exhaust gas after it has gone through the turbine. This combined cycle activity maximizes the power output. Several PDC units can be coupled, directing all of their exhaust into the same channel, but operating asynchronously to produce a quasisteady exhaust flow. Correct coupling can also yield beneficial acoustic cancellations, reducing system noise. FIG. 29 illustrates such a multi-pulse detonation combustor 81 coupled to a single turbine 82.

Detonation can be initiated either directly or by deflagration flame acceleration followed by a deflagration-to-detonation transition (DDT) process. Direct detonation initiation energy and power requirements are a function of the cell size, or cell width, of a detonable mixture which is a measure of the combustion reaction rates of the fuel mixture. Cell size is measured from the characteristic diamond shaped pattern created during detonation. Sensitive mixtures that are easily detonated are characterized by small cell sizes and regular cell structures. Direct initiation of a planar detonation in a well-confined tube requires two-orders-of-magnitude less energy than initiation of spherical detonation in unconfined mixtures.

Approximate relationships between cell size and detonation propagation have been established. For detonations confined in tubes, the minimum tube diameter for stable propagation is the order of 1 to 3 cell widths. Natural gas has a detonation cell width of approximately 30 cm.

Several researchers have experimentally measured the cell size and direct detonation initiation energy requirements for a variety of fuel/oxidizer mixtures. The cell size and the minimum energy required for direct detonation initiation for acetylene/air, hydrogen/air, ethylene/air and for several dense hydrocarbon/air mixtures is known. Minimum energies are approximately 128 Joules for acetylene/air, 4 JK for hydrogen/air, 30 KH for ethylene/air, and 260 KJ for several dense hydrocarbon/air mixtures. Hydrogen/oxygen detonation initiation energies require approximately 3 Joules to directly detonate the mixture. Therefore, approximately 3 orders of magnitude more energy is required to initiate hydrogen/air than hydrogen/oxygen. This trend has been found to be true for most fuel/air vs. fuel/oxygen mixtures. It is desirable to use the low detonation initiation energy requirements of sensitizers such as oxygen or more detonable fuels to enhance the overall detonability of fuel/air mixtures.

Pre-detonation tubes, explosive charges (e.g., tetryl), and high energy capacitive spark discharges have all been used to directly initiate detonation. A pre-detonation tube must be filled with a highly detonable mixture (e.g., hydrogen/oxygen) in which a detonation can be generated either directly or through a short DDT process. The distance required for DDT can be reduced by placing obstacles in the detonation tube to increase turbulence, create transverse pressure waves, and accelerate the DDT process. The detonation wave produced in the well-confined pre-detonation tube mixture can then be used to directly initiate detonation in the primary combustor. A detonation wave can be initiated by igniting a fuel/oxygen mixture in a small detonation tube which discharges into a primary combustor containing fuel/air. High voltage capacitive electrical spark ignitor systems can be used to deliver up to tens of Joules of energy in a single electrical discharge to ignite the pre-detonator mixture.

The detonation characteristics of natural gas (methane) can be elevated. Methane, propane or ethylene can be added to sensitize the mixture.

Single detonations utilizing methane/air mixtures can be conducted. A direct detonation initiator utilizing $H_2/O_2$ mixtures can be used. Detonation sensitivity and cell size are both functions of initial pressure.

A schematic of the current detonation testing apparatus is shown in FIG. 29. The detonation tube is instrumented with pressure transducers to measure unsteady detonation pressures and wave velocities as a function of distance. These values are then compared to the Chapman-Jouguet properties to determine the location of detonation onset. The location of detonation onset can also be determined by placing smoke foils along the inner tube wall. The smoke foils would show a characteristic pattern caused by the intersection of shock waves associated with the detonation process. The pressure transducers and foils indicate the distance required for the spark-initiated combustion to transition into a detonation wave (i.e. DDT length) in the primary fuel/air mixture initiated with an $H_2/O_2$ pre-detonator.

The invention includes a device and methods for producing ceramic powders or for oxydizing toxic materials. The device and two methods are similar and are described generally for a dust/gas mixture below, but can include gas/gas and liquid/gas mixtures, especially for toxic materials.

The dust/gas mixture can be a solid reactant dust (e.g., silicon or aluminum) suspended in a reactant gas or gases (e.g., ammonia) inside a detonation tube. The solid particles and gaseous reactants can be detonated as a two-phase dust/gas mixture.

Two-phase detonation of solid suspensions such as aluminum/air has been the subject of numerous experimental studies. Aluminum powder has been detonated successfully and detonation wave speeds of 1800 m/sec have been measured. Aluminum particle sizes below 10 microns resulted in self-sustaining stable detonations. Minimizing the reactant particle sizes reduces vaporization/reaction time scales and, as a result, minimizes detonation energy requirements. Therefore, it is important to use very fine reactant dusts in the proposed testing.

Chemical sensitization of the dust/gas mixture can also be used to minimize the initiation energy and power required for detonation. Sensitization consists of adding oxidizers, such as oxygen, or sensitive fuels, such as hydrogen and acetylene, to the main mixture. Candidate sensitizers need to have a minimal effect on the combustion reaction pathways so as not to inhibit the formation or degrade the purity of the ceramic products.

Detonation is directly initiated in the gas/dust mixture. Large energy deposition levels, as high as several hundred kilojoules, can be required to directly initiate detonation in the reactant dust/gas mixture. In addition, this energy has to be deposited in a very short period of time (i.e., high power levels are required). Explosive initiators are capable of depositing large amounts of energy and power, however, they cannot be readily utilized in a repetitive manner. The PDS process is its cyclic nature, and can use electrically-based initiation systems that can be fired repetitively. Conventional high energy capacitive spark systems can be fired cyclically, but can typically only deposit a few Joules of energy, and cannot directly initiate detonation in the proposed dust/gas mixtures.

The energy/power required to initiate detonation in the primary dust/gas mixture can be provided by a detonation wave created in an easily detonable gaseous mixture. This approach is commonly used in the field of detonation testing. A detonation initiation tube or pre-detonation section containing an easily detonable gas mixture such as hydrogen/oxygen or acetylene/oxygen is used. The detonation wave produced by the initiation tube raises the temperature of the primary dust/gas mixture to its autoignition temperature.

Figure 30:
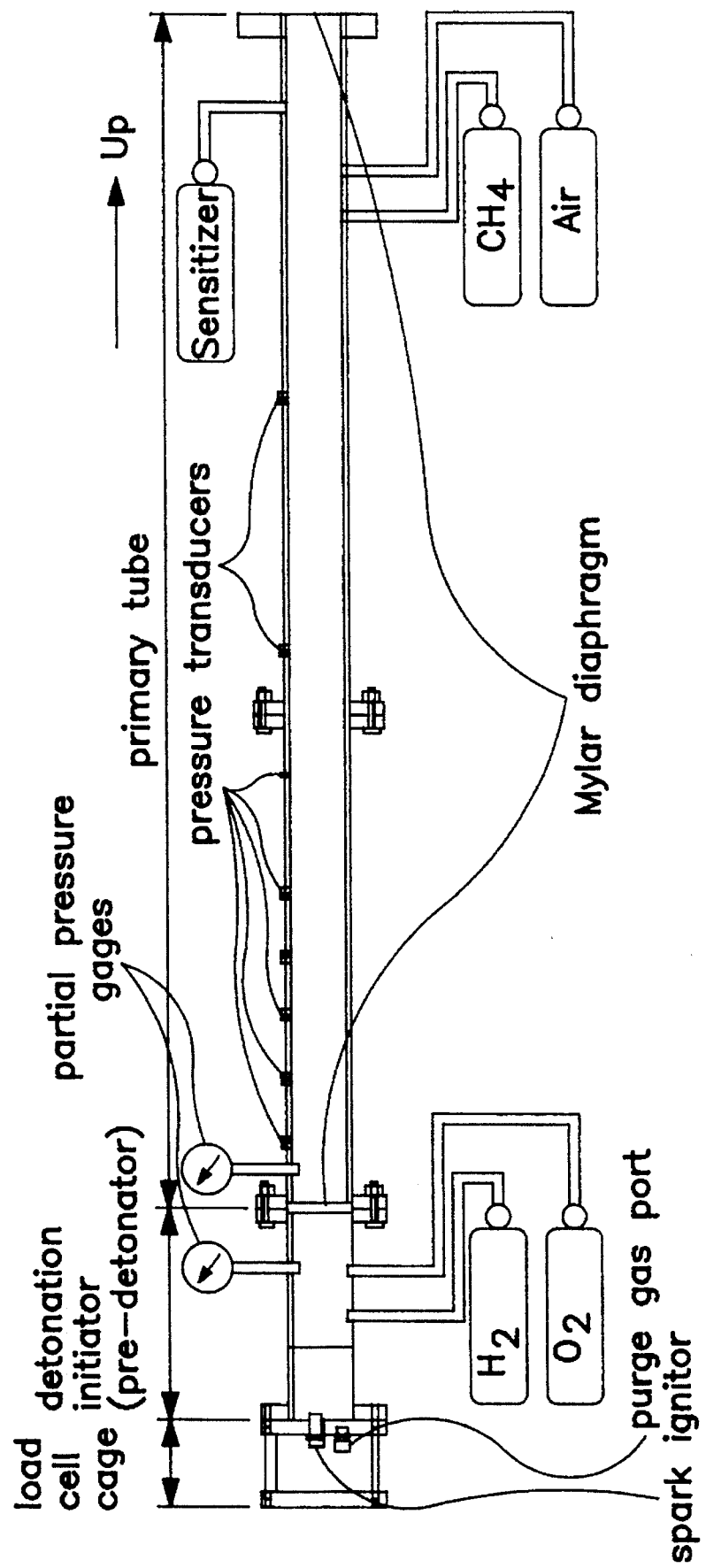
FIG. 30 is a schematic of one embodiment of a detonation tube.
Figure 31:
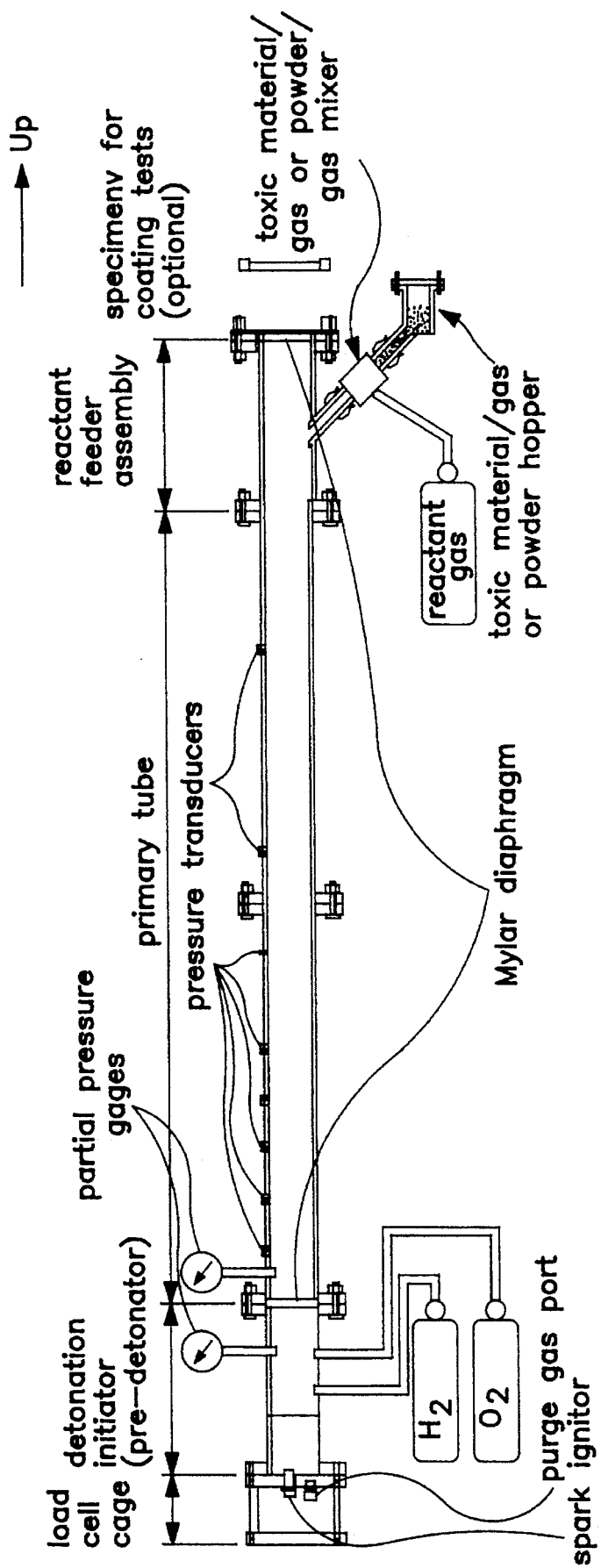
FIG. 31 is a schematic of one embodiment of a pulse detonation synthesis and/or toxic material destruction device.

Pulse detonation synthesis is demonstrated in a vertical detonation shock tube apparatus as depicted in FIG. 30. The reactant gas (e.g., ammonia) is supplied to the primary detonation tube via a dust-mixing chamber containing a pre-measured amount of reactant dust powder. The powder is mixed with the gas to form a dust/gas suspension that is introduced into the detonation chamber. The mixer is designed to produce a high degree of vorticity and turbulence to ensure a well-mixed suspension exists at the time of detonation initiation. The introduction of a fine dust/gas mixture at the top of the vertically oriented device also helps prevent premature settling of the solid reactant before detonation.

The pre-detonator tube is filled with a highly detonable gas mixture (e.g., hydrogen/oxygen) which is ignited by a high energy electrical spark discharge of 3 to 4 Joules. A detonation wave forms either directly or through a very short DDT process of several inches. The detonation wave travels vertically toward the primary tube, ruptures the mylar diaphragm separating the pre-detonator and primary sections, and initiates detonation in the dust/gas mixture. Combustion velocities and unsteady pressures in the dust/gas mixture are measured by a series of high speed pressure transducers located along the length of the primary detonation tube. These measurements are used to verify the combustion processes occurring within the tube (e.g., stable Chapman-Jouguet or overdriven detonation).

The invention can also directly spray metal surfaces with ceramic coatings. A metal bar or plate can be fastened to the top or open end of primary detonation chamber.

What is claimed is:

1. A rotary valve multiple combustor pulse detonation engine, comprising;
   at least two detonation chambers, each having an inlet end and an outlet end and further including means for preventing heat degradation of said chambers;
   a fuel manifold for supplying fuel from a fuel source to said at least two detonation chambers at said inlet ends;
   an inlet air duct manifold for supplying air to said at least two detonation chambers at said inlet ends;
   a means for initiating a pulsed supersonic shock wave-triggered detonation combustion wave in said at least two detonation chambers; and
   a rotor disk valve having at least one opening and at least one solid portion, wherein said rotor disk valve is positioned between said inlet ends of said at least two detonation chambers and said fuel and inlet air duct manifolds, wherein said rotor disk valve rotates so that said opening is positioned over said inlet end of one of said at least two detonation chambers to allow fuel and air to enter said one of said at least two detonation chambers, and wherein said rotor disk valve further rotates so that said solid portion is positioned over said inlet end of said one of said at least two detonation chambers so that said fuel and air inside said one of said at least two detonation chambers can be detonated by said means for initiating a pulsed supersonic shock wave-triggered detonation combustion wave.

2. The rotary valve multiple combustor pulse detonation engine of claim 1, further comprising:
   a manifold mounting plate connected to said fuel manifold and said inlet air duct manifold; and
   a combustor mounting plate connected to said at least two detonation chambers;
   wherein said rotor disk valve is positioned for rotation between said manifold mounting plate and said combustor mounting plate.

3. The rotary valve multiple combustor pulse detonation engine of claim 1, further comprising a bearing system positioned on a side of said rotor disk valve facing away from said at least two detonation chambers, wherein forces from said detonation chambers on said rotor disk valve are transferred through said bearing system.

4. The rotary valve multiple combustor pulse detonation engine of claim 1, wherein said fuel manifold ends in an individual fuel port for each detonation chamber and said inlet air duct manifold ends in an individual air port for each detonation chamber and wherein said individual fuel port has an extent in one direction less than an extent of said individual air port so that when said opening of said rotor disk valve closes said individual fuel port, said individual air port remains open; so that air but not fuel is introduced into said detonation chamber to create an air buffer after said detonation chamber is fueled.

5. The rotary valve multiple combustor pulse detonation engine of claim 1, wherein said fuel manifold ends in an individual fuel port for each detonation chamber and said inlet air duct manifold ends in an individual air port for each detonation chamber and wherein said individual fuel port has an extent in one direction less than an extent of said individual air port, so that when said opening of said rotor disk valve opens said inlet end of said detonation chamber, said individual air port is open but said individual fuel port remains closed so that air but not fuel is introduced into said detonation chamber to purge said detonation chamber of any remaining burned gases.

6. The rotary valve multiple combustor pulse detonation engine of claim 1, wherein said means for preventing heat degradation of said detonation chambers is a passive cooling means.

7. The rotary valve multiple combustor pulse detonation engine of claim 6, wherein said passive cooling means is an ablative passive means comprising an ablative liner disposed on the interior surface of said detonation chambers.

8. The rotary valve multiple combustor pulse detonation engine of claim 7, wherein said ablative passive means in an ablative material selected from the group of materials consisting of phenolic-based materials, silica phenolic, graphite phenolic, asbestos phenolic graphite, cloth phenolic impregnated, refrasil, epoxy-based materials, ablative plastics, pyrolytic graphite, and combinations thereof.

9. The rotary valve multiple combustor pulse detonation engine of claim 1, wherein said means for preventing heat degradation of said detonation chamber is an active cooling means.

10. The rotary valve multiple combustor pulse detonation engine of claim 9, wherein said active cooling means is adapted to circulate a cooling medium around said detonation chambers.

11. The rotary valve multiple combustor pulse detonation engine of claim 10, wherein said active cooling means consists of a sleeve disposed concentrically around each said detonation chamber, said cooling sleeve and detonation chamber forming an annular region through which said cooling medium flows.

12. The rotary valve multiple combustor pulse detonation engine of claim 10, wherein said active cooling means consists of a tube wrapped around the detonation chamber in a helical manner.

13. The rotary valve multiple combustor pulse detonation engine of claim 10, wherein said cooling medium is the same as the fuel used to power said engine.

14. The rotary valve multiple combustor pulse detonation engine of claim 1, wherein said means for initiating a pulsed supersonic shock wave-triggered detonation combustion wave comprises a spark plug.

15. The rotary valve multiple combustor pulse detonation engine of claim 1, further comprising an oxidizer and/or fuel sensitizer source and wherein said means for initiating a pulsed supersonic shock wave-triggered detonation combustion wave comprises a separate pre-detonation tube which is supplied with an oxidizer and/or fuel sensitizer from said oxidizer and/or fuel sensitizer source.

16. The rotary valve multiple combustor pulse detonation engine of claim 1, further comprising an oxidizer and/or fuel sensitizer source for supplying an oxidizer and/or fuel sensitizer to said detonation chambers and wherein said means for initiating a pulsed supersonic shock wave-triggered detonation combustion wave comprises a separate pre-detonation region within said detonation chambers created by supplying said and/or fuel sensitizer from said oxidizer and/or fuel sensitizer source to said detonation chambers.

17. The rotary valve multiple combustor pulse detonation engine of claim 1, further comprising a diverging nozzle connected to said outlet ends of said at least two detonation chambers.

18. The rotary valve multiple combustor pulse detonation engine of claim 1 wherein said fuel source contains a fuel sensitizer additive.

19. A pulse detonation engine comprising:
   at least one detonation chamber having an inlet end and an outlet end, and further comprising means for preventing fuel oxidizer autoignition and heat degradation of said chamber, said inlet end comprising an injector head having a plurality of openings therein, said openings adapted to act as:

an inlet fuel manifold for supplying fuel from a fuel source directly to said at least one detonation chamber; and an oxidizer manifold for supplying an oxidizer to said at least one detonation chamber;

a fuel source;

an inlet air duct manifold for supplying air directly to said at least one detonation chamber; and a means for initiating a pulsed supersonic shock wave-triggered detonation combustion wave in said at least one detonation chamber.

20. The pulse detonation engine of claim 19, wherein said injector head has at least three openings, one of said openings adapted to act as said inlet fuel manifold; one of said openings adapted to act as said inlet air duct manifold; and,one of said openings adapted to act as said oxidant inlet.

21. The pulse detonation engine of claim 19, wherein said means for initiating a pulsed supersonic shock wave-triggered detonation combustion wave comprises a spark plug.

22. The pulse detonation engine of claim 19, further comprising an oxidizer and/or fuel sensitizer source and wherein said means for initiating a pulsed supersonic shock wave-triggered detonation combustion wave comprises a separate pre-detonation tube which is supplied with an oxidizer and/or fuel sensitizer from said oxidizer and/or fuel sensitizer source.

23. The pulse detonation engine of claim 19, further comprising an oxidizer and/or fuel sensitizer source for supplying an oxidizer and/or fuel sensitizer to said detonation chamber and wherein said means for initiating a pulsed supersonic shock wave-triggered detonation combustion wave comprises a separate pre-detonation region within said detonation chamber created by supplying said oxidizer and/or fuel sensitizer from said oxidizer and/or fuel sensitizer source to said detonation chamber.

24. The pulse detonation engine of claim 19, further comprising means for preventing heat degradation of said detonation chamber.

25. The pulse detonation engine of claim 24, wherein said means for preventing heat degradation of said detonation chamber is a passive cooling means.

26. The pulse detonation engine of claim 25, wherein said passive cooling means is an ablative passive means comprising an ablative liner disposed on the interior surface of said detonation chamber.

27. The pulse detonation engine of claim 26, wherein said ablative means is an ablative passive material selected from the group of materials consisting of phenolic-based materials, silica phenolic, graphite phenolic, asbestos phenolic graphite, cloth phenolic impregnated, refrasil, epoxy-based materials, ablative plastics, pyrolytic graphite, and combinations thereof.

28. The pulse detonation engine of claim 24, wherein said means for preventing heat degradation of said detonation chamber is an active cooling means.

29. The pulse detonation engine of claim 28, wherein said active cooling means is adapted to circulate a cooling medium around said detonation chamber.

30. The pulse detonation engine of claim 29, wherein said active cooling means consists of a sleeve disposed concentrically around each said detonation chamber, said cooling sleeve and detonation chamber forming an annular region through which said cooling medium flows.

31. The pulse detonation engine of claim 29, wherein said active cooling means consists of a tube wrapped around the detonation chamber in a helical manner.

32. The pulse detonation engine of claim 29, wherein said cooling medium is the same as the fuel used to power said engine.

33. The rotary valve multiple combustor pulse detonation engine of claim 19 wherein said fuel source contains a fuel sensitizer additive.

34. The rotary valve multiple combustor pulse detonation engine of claim 33 wherein said fuel sensitizer additive is nitromethane.

35. The pulse detonation engine of claim 19 wherein said fuel source contains a fuel sensitizer additive.

36. The rotary valve multiple combustor pulse detonation engine of claim 1 further comprising a single nozzle for each detonation tube.

37. The rotary valve multiple combustor pulse detonation engine of claim 1, wherein said rotor valves are conical in shape.

38. The rotary valve multiple combustor pulse detonation engine of claim 1, wherein a rotor valve exists between the said at least two detonation chambers and a nozzle.

39. The rotary valve multiple combustor pulse detonation engine of claim 1, further comprising a separate nozzle for each detonation tube.

* * * * *